(12) United States Patent
Beery

(10) Patent No.: US 6,215,531 B1
(45) Date of Patent: Apr. 10, 2001

(54) APPARATUS FOR CONTROLLING A TELEVISION RECEIVER

(76) Inventor: Jack Beery, 1550 Cedar Bark Trail, Unit 1, Dayton, OH (US) 45449

(*) Notice: Subject to any disclaimer, the term of this patent is extended or adjusted under 35 U.S.C. 154(b) by 0 days.

(21) Appl. No.: 09/338,899

(22) Filed: Jun. 23, 1999

Related U.S. Application Data

(63) Continuation of application No. 08/482,940, filed on Jun. 7, 1995, now Pat. No. 5,963,269.

(51) Int. Cl.$^7$ ........................................................ H04N 5/44
(52) U.S. Cl. .................................... 348/734; 348/731
(58) Field of Search .................................. 348/731–733, 348/734, 570; 340/825.72, 825.31, 825.69, 825.22, 825.03; 359/146; 455/5.1, 6.1, 4.2, 3.1, 151.4, 182.2, 186.1, 151.2, 151.1; H04N 5/44

(56) References Cited

U.S. PATENT DOCUMENTS

| | | | |
|---|---|---|---|
| 4,959,720 | * 9/1990 | Duffield et al. | 348/731 |
| 5,045,947 | * 9/1991 | Beery | 348/731 |
| 5,585,865 | * 12/1996 | Amano et al. | 348/731 |
| 5,673,089 | * 9/1997 | Yuen et al. | 348/734 |
| 5,883,680 | * 3/1999 | Nykerk | 348/734 |
| 5,963,269 | * 10/1999 | Beery | 348/570 |

* cited by examiner

*Primary Examiner*—Michael Lee

(57) ABSTRACT

Apparatus for controlling a television receiver includes a read-only memory for storing a plurality of labels, and a programmable memory for storing at least one channel number. An operator-actuated control generates a signal representative of one of the labels and a channel number to be associated therewith, and a processor receives the signal and causes the programmable memory to store the channel number as corresponding to the one label. The operator-actuated control further generates a second signal representative of the one label indpendent of the channel number. Upon receiving the second signal, the processor retrieves from the programmable memory the channel number and generates an output control signal corresponding to the channel number.

6 Claims, 14 Drawing Sheets

APPARATUS FOR CONTROLLING A TELEVISION RECEIVER

This is a continuation of Ser. No. 08/482,940, filed Jun. 7, 1995, now U.S. Pat. No. 5,963,269.

BACKGROUND OF THE INVENTION

The present invention relates generally to devices for controlling a television receiver and, more particularly, to such a devices as used for channel selection.

In recent years, a number of devices have been developed for use in controlling equipment for receiving television broadcast information such as televisions, videorecorders, cable boxes and satellite receivers. As the receiving equipment has become more complex, and the capability to broadcast an increasing variety of material has grown, the devices for controlling such equipment have become correspondingly more sophisticated.

Often (although not always), such control devices have taken the form of remote control devices useable to control a number of different pieces of equipment available from a number of different manufacturers.

As a result of the increase in available programming, there has been a need to simplify the channel selection process for the television receiver operator. With a relatively large number of channels available, the operator may have to be familiar with the channel location of various networks and individual programs, or in the alternative, may have to scan through a number of channels to find the desired broadcast. Differences between channel number assignments from one locality to the next, or from one cable service provider to the next, further complicate this problem.

Various solutions have been proposed to these problems. For example, it is known to provide a control device in which the operator may program labels for the identification of channels. In one such approach, as described in U.S. Pat. No. 4,228,541, the label is simply displayed on the television screen after the operator selects the channel using the conventional channel number. In this way, the operator can assure himself that the correct channel has been chosen.

In addition to a simple display, it is known to provide a control device in which the operator may use the label directly for channel selection lieu of the conventional channel number assigned by the broadcaster, cable provider or governmental regulatory body. For example, in U.S. Pat. Nos. 5,045,947 and 5,068,734, the user may program labels which he creates or obtains from some other source into memory in association with particular channel numbers. When the labels are subsequently entered into the control device, the television receiver is caused to tune the channel corresponding to the stored label.

Still further, it is known to provide the operator with a scan feature whereby the channels may be stepped through in sequence for channel selection. It is common to provide a control device having the ability to delete inactive or unwanted channels from the scan. As an enhancement to this feature, the above cited U.S. Pat. Nos. 5,045,947 and 5,068,734 disclose control devices in which channels may be placed into a scan in any desired order, or may be placed into one or more of a plurality of scanning sequences which to the operator may associate with programming categories, personal preferences and the like.

Still other control devices have been developed which are directed towards problems encountered in recording television broadcasts using a videorecorder. For example, U.S. Pat. No. 5,307,173 discloses a system in which a compressed code may be found in published television program schedules. The code is entered into the device and decoded to provide time, date, channel and duration information concerning the program to be recorded. This data is then used by the device to control the videorecorder to record the desired program.

While such a device is useful in simplifying recording, it still requires an initial set-up operation. Because of the variation in channel numbers from locality to locality at which various networks and stations may be found, the device executes a channel conversion operation to convert a "defined" channel number used in the codes into the actual channel number at which the program may be found. This conversion is based upon an initial configuration entered by the operator that programs into memory the corresponding channel numbers.

Each of these improvements is advantageous in controlling a television receiver. However, each of these features adds further complexity to the task of initially programming the control device prior to use, or of changing the configuration when needed or desired. Additionally, each feature requires a certain amount of programmable memory for the control device. Such memory is often limited in control devices, either as a result of component capability or costs. Thus, either the capacity of, for example, a label memory is limited to a relatively small number of channels, or the number of different features which may be provided in the control device is limited, or both.

SUMMARY OF THE INVENTION

In accordance with the present invention, apparatus is provided for controlling a television receiver to select a television channel corresponding to a preassigned channel number. The apparatus includes a read-only memory for storing a plurality of labels, and a programmable memory for storing at least one channel number. An operator-actuated control generates a first signal comprising a data set representative of one of the labels and a channel number to be associated therewith. A processor receives the first signal, and responsive thereto, causes the programmable memory to store the channel number as corresponding to the one label.

The operator-actuated control further generates a second signal comprising a data set representative of the one label independent of the channel number. Upon receiving the second signal, the processor retrieves from the programmable memory the channel number and generates an output control signal corresponding to the channel number.

In one embodiment of the invention, each of the labels is stored in the read-only memory as one of an ordered series of predetermined ROM address. The programmable memory includes a plurality of RAM addresses, each of the RAM addresses being capable of storing one of the channel numbers thereat. The programmable memory also stores a marker bit value for each of the ROM addresses, and upon receipt of the first signal, the processor causes an activated value to be stored for the marker bit corresponding to the ROM address for the one label. The processor then counts the number of the activation values corresponding to the ROM addresses preceding the label and stores the channel number at the RAM address corresponding to the count.

Upon receipt of the second signal, the processor retrieves the corresponding channel number by counting the number of activation values corresponding to the ROM addresses preceding the one label and retrieving the channel number from the one of the RAM addresses corresponding to the count.

DETAILED DESCRIPTION OF THE PREFERRED EMBODIMENTS

Figure 1:
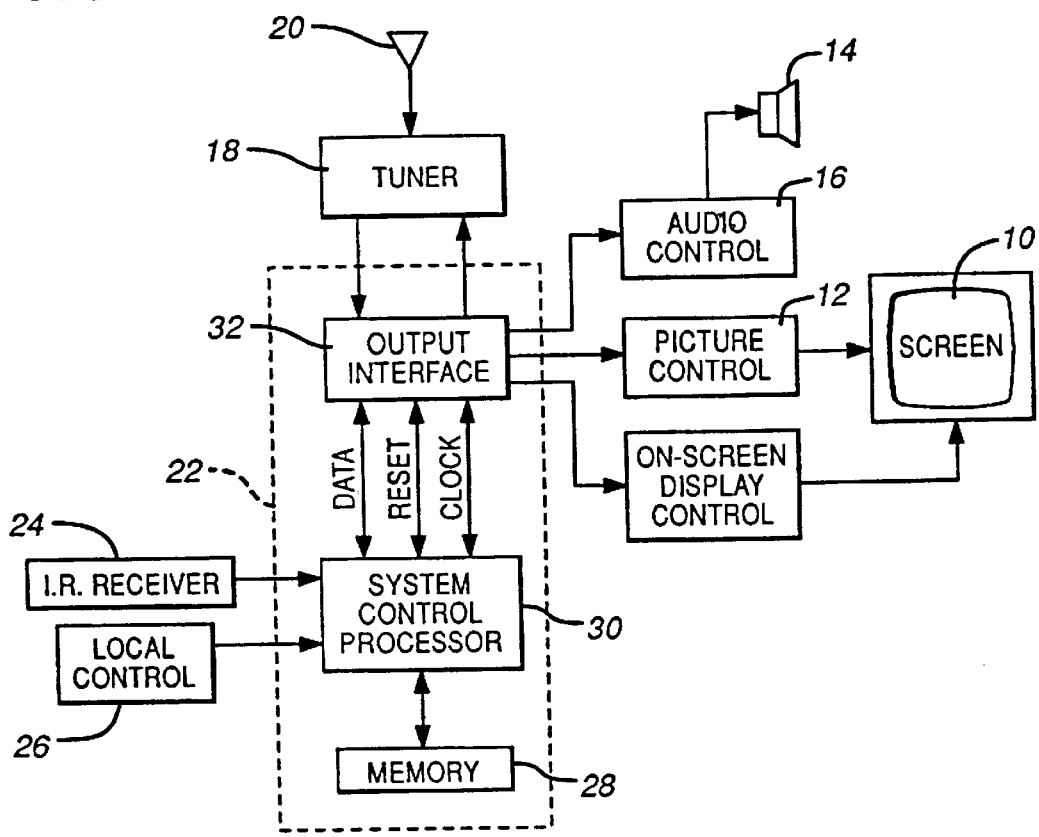
FIG. 1 is a block diagram illustrating a typical television receiver.

A general block diagram of a television receiver with which a preferred embodiment of the present invention may be used is shown in FIG. 1. The specific circuitry comprising the various blocks as shown in FIG. 1 are conventional, and the detailed design of the individual circuits will be known to those of ordinary skill in the art.

It will be recognized that while the preferred embodiment is described in connection with use with a television, the term "television receiver" as used herein is intended to include not only conventional television sets, but also videocassette recorders, satellite receivers, or any other apparatus capable of tuning a television signal from a multiple-channel source.

Referring now to FIG. 1, the television system includes a screen 10, under immediate control of picture control circuitry 12 which for description purposes includes various power supply circuits, raster scan circuits, color control circuits and the like which are conventional and typically associated with a television receiver. A speaker 14 or other sound output means receives an audio output signal from audio control circuitry 16, again which includes conventional and typical circuitry including power supply, amplifier, audio filter and similar circuits.

A tuner 18 receives a multi-channel input at 20 and tunes out all but a selected channel for viewing. It will be recognized that the multi-channel input received by tuner 18 at 20 may be a convention cable input signal, but may also be the input signal received from a satellite transmission receiver. Moreover, the present invention may be used with any television input signal, including a conventional over-the-air broadcast signal received through a conventional antenna.

Tuner 18, audio control 16 and picture control 12 operate under the control of processing unit 22, which may be any conventional programmable microprocessor or other means capable of receiving input control signals and producing a corresponding output control signal. Processing unit 22 in turn is controlled by conventional operator-actuated controls. These controls may be in the form of a keypad, push-button switches and/or other conventional control devices that provide the user with local control 26 directly at the television receiver.

In addition, in accordance with the preferred embodiment for the invention, the television receiver also is capable of control from a hand-held remote control unit. Input from the remote unit is received, in a preferred embodiment, in the form of infrared transmissions by infrared receiver 24. This input is in turn supplied to processing unit 22.

Processing unit 22 includes memory 28 for storing the control program for controlling the television receiver, control processor 30 for receiving input from memory 28 and operator input from either infrared receiver 24 or local control 26 and executing the control program, and output interface 32 for directing the output from control processor 30 to the appropriate circuits. As is known, these components may be located on one or more integrated circuit chips as appropriate. As part of the control program, memory 28 includes the tuning data necessary to tune out all but one particular channel of the incoming television signal, which channel is then directed to the picture control and audio control for viewing on the television. This channel is identified, in the preferred embodiment, by a "channel number;" i.e., the numerical designation assigned to a particular incoming signal frequency by government control agencies and the number traditionally used in channel selection by television viewers.

In one preferred embodiment, the present invention may be embodied in a separate, remote control unit. Such a remote control can be adapted for use with a variety of television receivers from a variety of manufacturers, using conventional techniques well known in the art. Such a "universal" remote control can be offered for sale without being directly associated with a particular television receiver. In the alternative, it will be readily recognized that the present invention may be incorporated into a remote control which is specific to a television receiver the remote is intended to control. In a further alternative, the invention may be incorporated into the television receiver itself, and operated either through the local control built into the television receiver, or through a conventional remote control.

Figure 2:
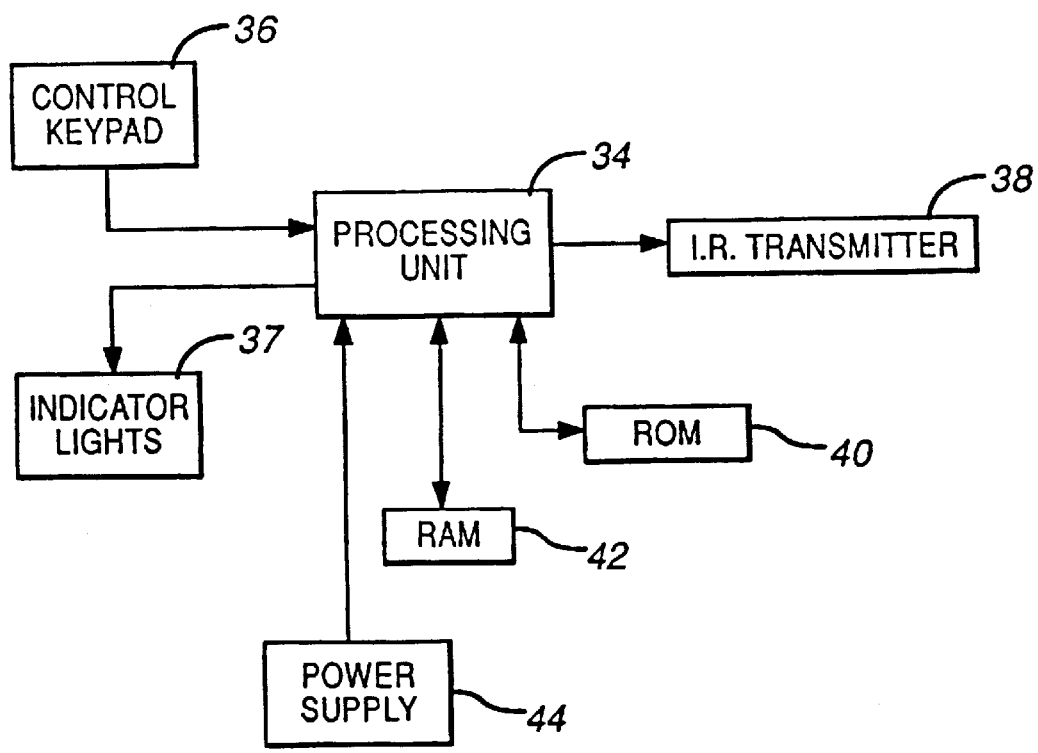
FIG. 2 is a block diagram illustrating a remote control device for the television control system of the present invention.

One embodiment for a remote control unit in accordance with the present invention may be seen by reference to FIG. 2. The remote unit operates under control of its own processing unit 34, which may be for example a microprocessor located on a single integrated circuit chip. Microprocessor chips suitable for use with the present invention are commercially available from chip manufacturers such as Phillips. Connected to processor unit 34 is a control keypad 36 for operator input, including alpha-numeric and other control keys, as will be described in detail below. Also controlled by processor unit 34 is a plurality of indicator lights 37, the lights being conventional light sources such as LEDs. A conventional I.R. transmitter 38 sends coded control instructions to the television receiver as directed by the microprocessor.

Associated with processing unit 34 is a read-only memory 40 which includes the operating program used by the remote control in controlling the television receiver, as well as the stored, preset labels to be described in detail herein. Memory 40 may be any suitable, conventional ROM (read-only memory) device. Also associated with processing unit 34 is RAM (random-access memory) 42. This memory 42 serves to store the channels to be assigned to stored labels, as well as user labels programmed into the system. As explained in detail herein, the present invention permits a relatively small RAM to be utilized in controlling the television receiver, and the device is preferably an electrically erasable programmable read only memory (EE PROM), or a non-volatile random access memory (NV RAM), the latter preferably equipped with a battery-powered back up. Either of these alternatives are well known to those skilled in the art, and are readily commercially available. In accordance with a preferred embodiment of the present invention, both ROM and RAM are built into the microprocessor integrated circuit chip.

A power supply 44 is included for powering the remote control unit, the power supply being a battery source as is typical in the art.

Figure 3:
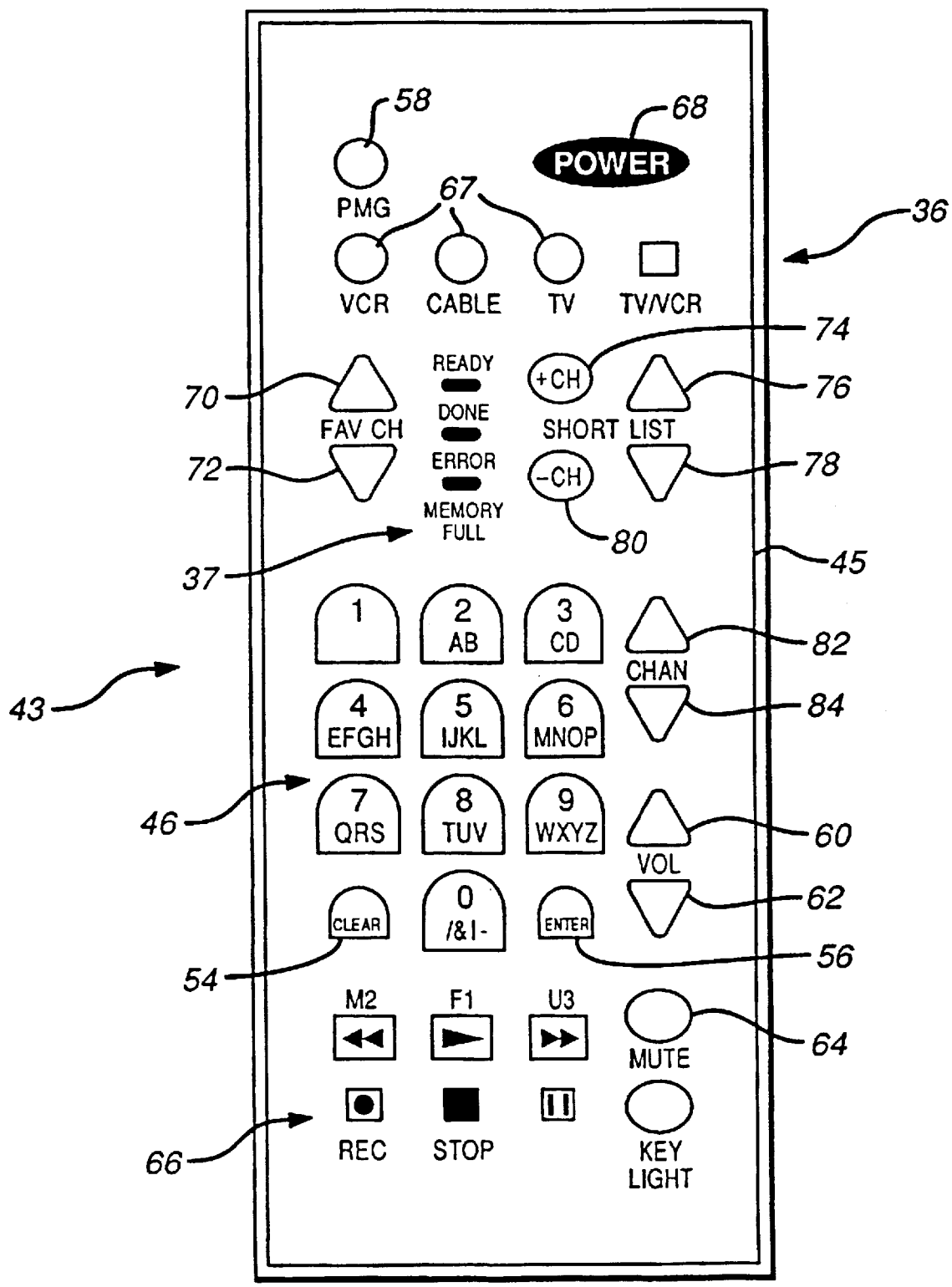
FIG. 3 is a perspective view of a remote control unit for the control system of FIG. 2.

A preferred embodiment for the layout of keypad 36 may be seen on the remote unit 43 shown in FIG. 3. As can be seen, keypad 36 may be mounted in an appropriate housing 45 which also includes a removable access panel (not shown) for the remote unit power source. The keypad includes various keys, each with its designation imprinted thereon. For example, alpha-/numeric keys 46 for numerals "0"–"9" are provided. Alphabetic characters are provided on the keys for numerals "2"–"9", with certain special characters provided on the "0" numeral key.

Keypad 36 also includes a number of special keys. The "clear" key 54, "enter" key 56 and "PGM" (program) key 58 are used in programming the remote control unit. Other keys conventional in "universal" remote television control devices are be provided, such as volume up and volume down keys 60 and 62, mute key 64, conventional videorecorder control keys 66, device selection keys 67 which enable the device to selectively control a television, videorecorder or cable control box, and a power control key 68 to turn the controlled device on and off.

Other keys 70, 72, 74, 76, 78, 80, 82 and 84 are used in connection with the programming or use of the device, and will be described in connection with such use. As will be described, certain of the videorecorder control keys 66 are used, in addition to their normal videorecorder control function, in programming the device.

Indicator lights 37 are also mounted in the housing 45 as shown.

Operation of the control system is in accordance with a program resident in processing unit 34 located within the remote unit. A preferred embodiment for the control program may be seen by reference to FIGS. 4–8. In general, control of various television receiver functions, such as volume control, muting and the like, is conventional and will not be described herein. The channel selection portion of the program is described in detail.

The control system, in addition to conventional television tuning by direct entry of channel numbers, operates in either a "channel selection" mode, wherein the operator selects the desired viewing channel using channel labels or scan sequences which the operator has previously programmed, or in a "program" mode, wherein the label and scan sequence assignments are made, changed, reviewed and the like. Programming of labels will be described first, with specific reference made to FIG. 4.

The present invention simplifies the programming of labels in that a number of labels are prestored in the ROM and may be selectively activated by the operator for use in locating television programming. These labels may be identified by the operator by pressing the various alpha/numeric keys of the keypad 36. In the preferred embodiment, because the alphabetic characters are imprinted on keys which are otherwise numeric keys, the system may treat both alphabetic and numeric characters in labels simply as a keystroke sequence. Moreover, for simplicity of explanation, the keystroke sequence will be described and reference herein using the decimal value represented by the numeric values imprinted on the keys which have been manipulated. That is, entry of the label "HBO" is made by pressing keys "4", "2" and "6" in sequence, and the label may be referred to herein by the numeric value "426". However, it will be recognized by those skilled in the art that as is typical, the data may actually be transmitted, stored and/or manipulated by the device as binary or hexadecimal numbers representative of the key sequence. In the "HBO" example, the data used by the system to represent the keystroke entry may be the binary value "110101010" or the hexadecimal value "1AA".

Certain predefined labels stored in ROM, or "stored labels" as referred to herein, are provided for the television services commonly provided on cable television systems and over-the-air broadcasting. In one preferred embodiment, forty-eight such stored labels are provided, one located in each of forty-eight ROM addresses. These stored labels are summarized in the following Table I:

TABLE I

| Station Label | Marker Bit No. | NumericKey Sequence | Station |
| --- | --- | --- | --- |
| A&E | 1 | 204 | Arts and Entertainment |
| ABC | 2 | 223 | American Broadcasting Company |
| AMC | 3 | 263 | American Movie Classics |
| ATC | 4 | 283 | America's Talking |
| BET | 5 | 248 | Black Entertainment TV |
| BRV | 6 | 278 | Bravo |
| CBS | 7 | 327 | Columbia Broadcasting System |
| CMT | 8 | 368 | Country Music Television |
| CNBC | 9 | 362 | Consumer News and Bus. |
| CNN | 10 | 366 | Cable News Network |
| CNNH | 11 | 3664 | Headline News |
| CS1 | 12 | 371 | C-Span 1 |
| CS2 | 13 | 372 | C-Span 2 |
| CTV | 14 | 388 | Comedy Central |
| DIS | 15 | 357 | The Disney Channel |
| DSC | 16 | 373 | The Discovery Channel |
| E?- | 17 | 400 | Entertainment Network |
| ESN | 18 | 476 | Ent. Sports Network (ESPN) |
| ESN2 | 19 | 4762 | ESPN 2 |
| FOX | 20 | 469 | Fox Broadcasting |
| HBO | 21 | 426 | Home Box Office |
| HBO2 | 22 | 4262 | Home Box Office 2 |
| HBO3 | 23 | 4263 | Home Box Office 3 |
| LIF | 24 | 554 | Lifetime |
| MAX | 25 | 629 | Cinemax |
| MTV | 26 | 688 | Music Television |
| NBC | 27 | 623 | National Broadcasting Company |
| NEWS | 28 | 6497 | User's Local News Channel |
| NIK | 29 | 655 | Nickelodeon |
| PBS | 30 | 627 | Public Broadcasting Company |
| PLA | 31 | 652 | Playboy Channel |
| QVC | 32 | 783 | Value Network |
| SHO | 33 | 746 | Showtime |
| SCIFI | 34 | 73545 | Sci-Fi Channel |
| SPTCH | 35 | 76834 | Sports Channel |
| TBS | 36 | 827 | TBS Superstation |
| TFC | 37 | 843 | The Family Channel |
| TLC | 38 | 853 | The Learning Channel |
| TMC | 39 | 863 | The Movie Channel |
| TNN | 40 | 866 | The Nashville Network |
| TNT | 41 | 868 | Turner Network Television |
| TOON | 42 | 8666 | The Cartoon Network |
| TRAV | 43 | 8728 | Travel Channel |
| TWC | 44 | 893 | The Weather Channel |
| USA | 45 | 872 | USA Network |
| VH1 | 46 | 841 | Video Hits 1 |
| WGN | 47 | 946 | WGN-Chicago |
| WOR | 48 | 967 | WWOR-New York |

Of course, it will be recognized that various other labels could be provided, and that there is no particular limitation on the number of such possible labels, subject to the keystroke combinations and the size limitation of the ROM.

It will be observed that most of the labels set out in Table I are comprised of three characters, while several are comprised of four or five characters. Of course, subject to memory limitations and desired complication level in the label permitted, any number of characters may be provided for. In the preferred embodiment, each ROM address in which a stored label has been stored includes an additional data entry indicative of whether the three or more label characters are "absolute", or whether one or more "free characters" may be permitted during label use for channel selection. Any permitted free characters are ignored during label tuning. Thus, in the event free characters are permitted for the label "LIF" (keystroke sequence "554"), the user may obtain this channel also by entering "LIFE", as the "E" in the label is simply ignored. However, free characters may not be permitted for labels such as "HBO" (keystroke sequence "426"), in which case entry of "HBOF" for channel retrieval will not result in the channel being tuned. In the "HBO" example, one reason for this restriction is the presence of labels "HBO2" and "HBO3" that require the fourth character to be properly identified.

In addition to stored labels, the preferred embodiment of the present invention permits the operator to program certain labels that are not stored in ROM, but rather may be designated by the operator. Such labels, referred to herein as "programmed" labels, are stored within a reserved group of addresses in RAM. In the preferred embodiment described, ten such programmed labels may be used, with a maximum total of fifty activated labels, both stored and programed, being permitted. Use of the full ten programmed labels limits the operator to activation of forty stored labels, while use of only nine programmed labels permits activation of forty-one stored labels, and so forth.

Figure 4:
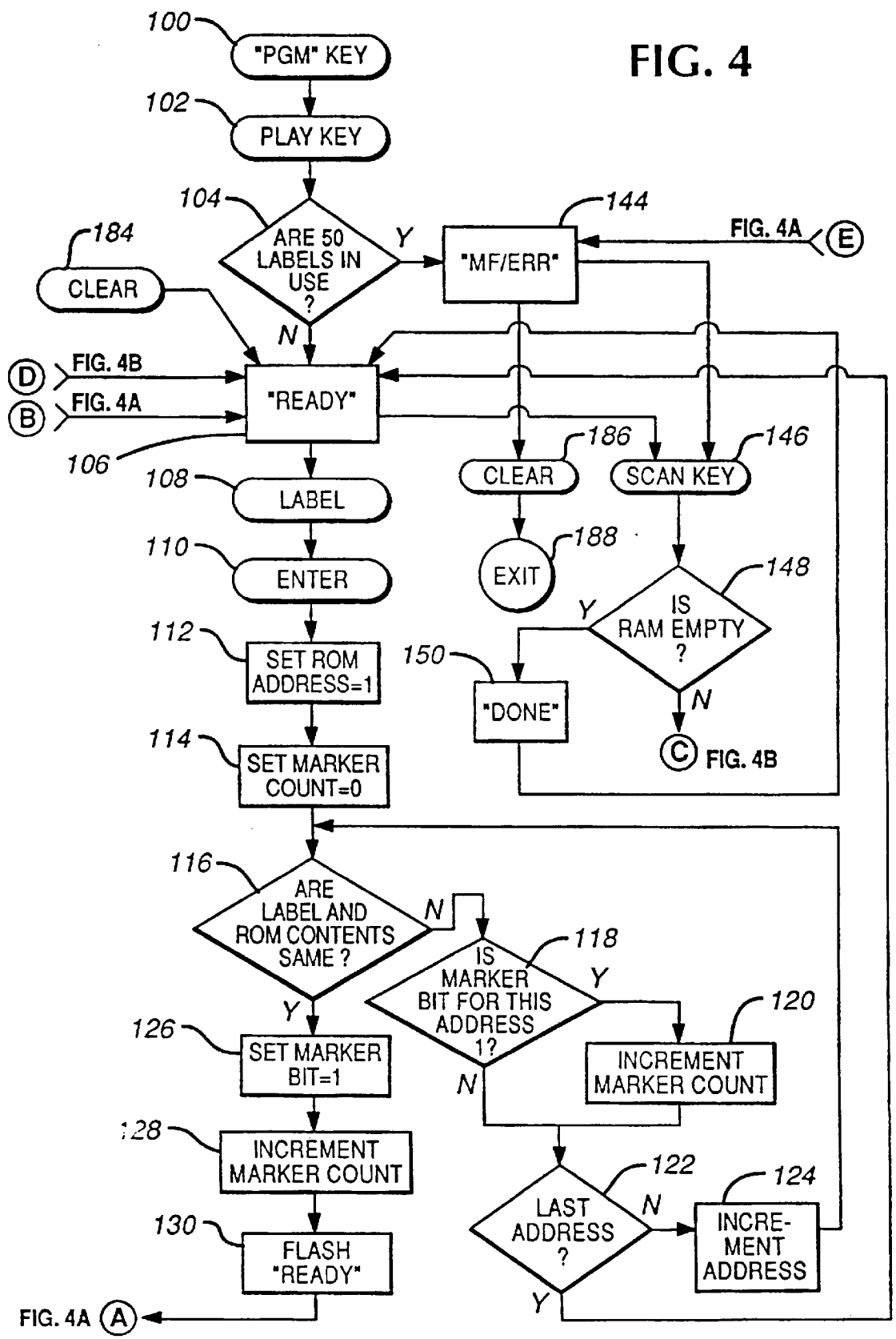
FIGS. 4–9 are flowchart diagrams of a program for operating the control system of the present invention.
Figure 4A:
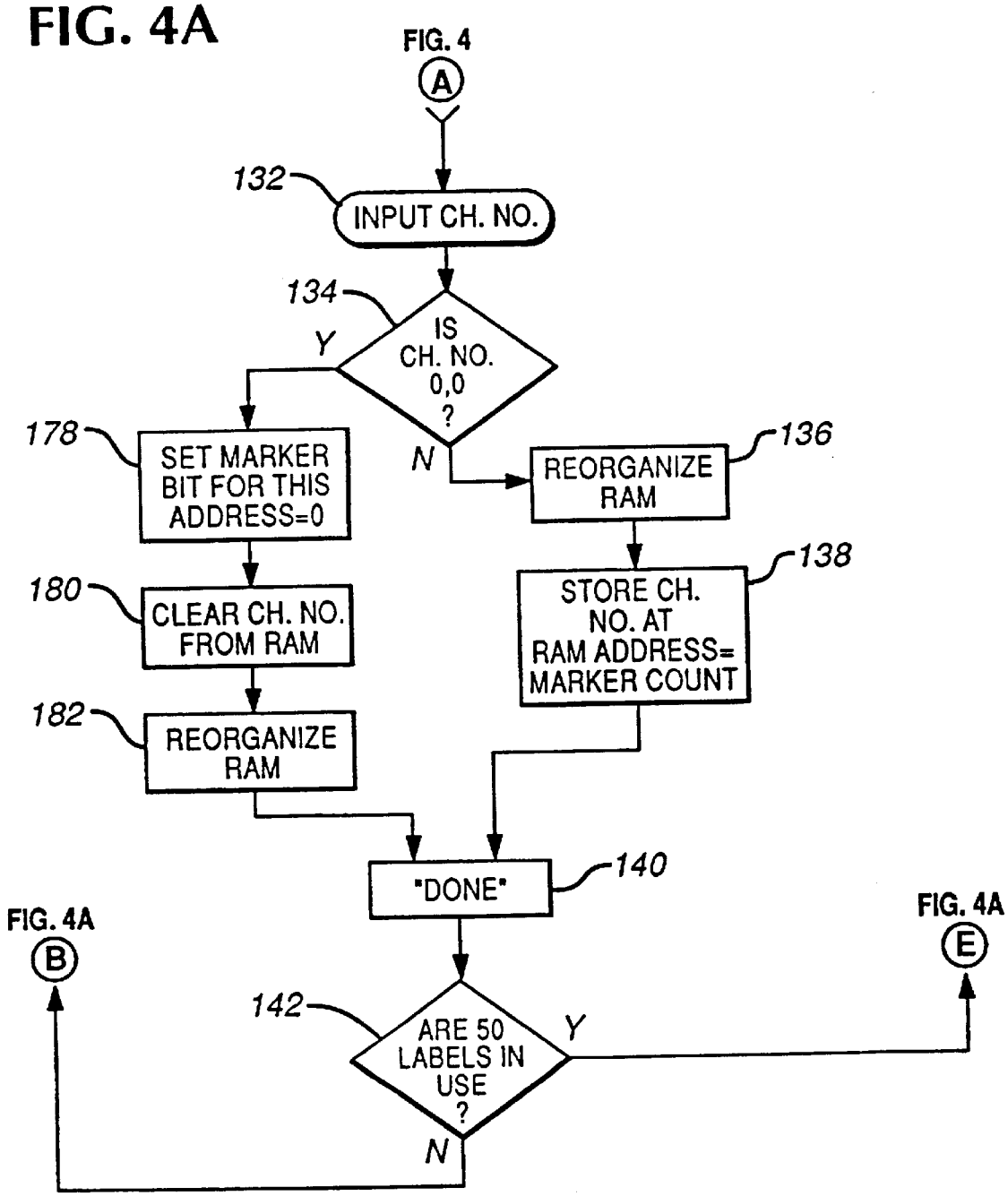
Figure 4B:
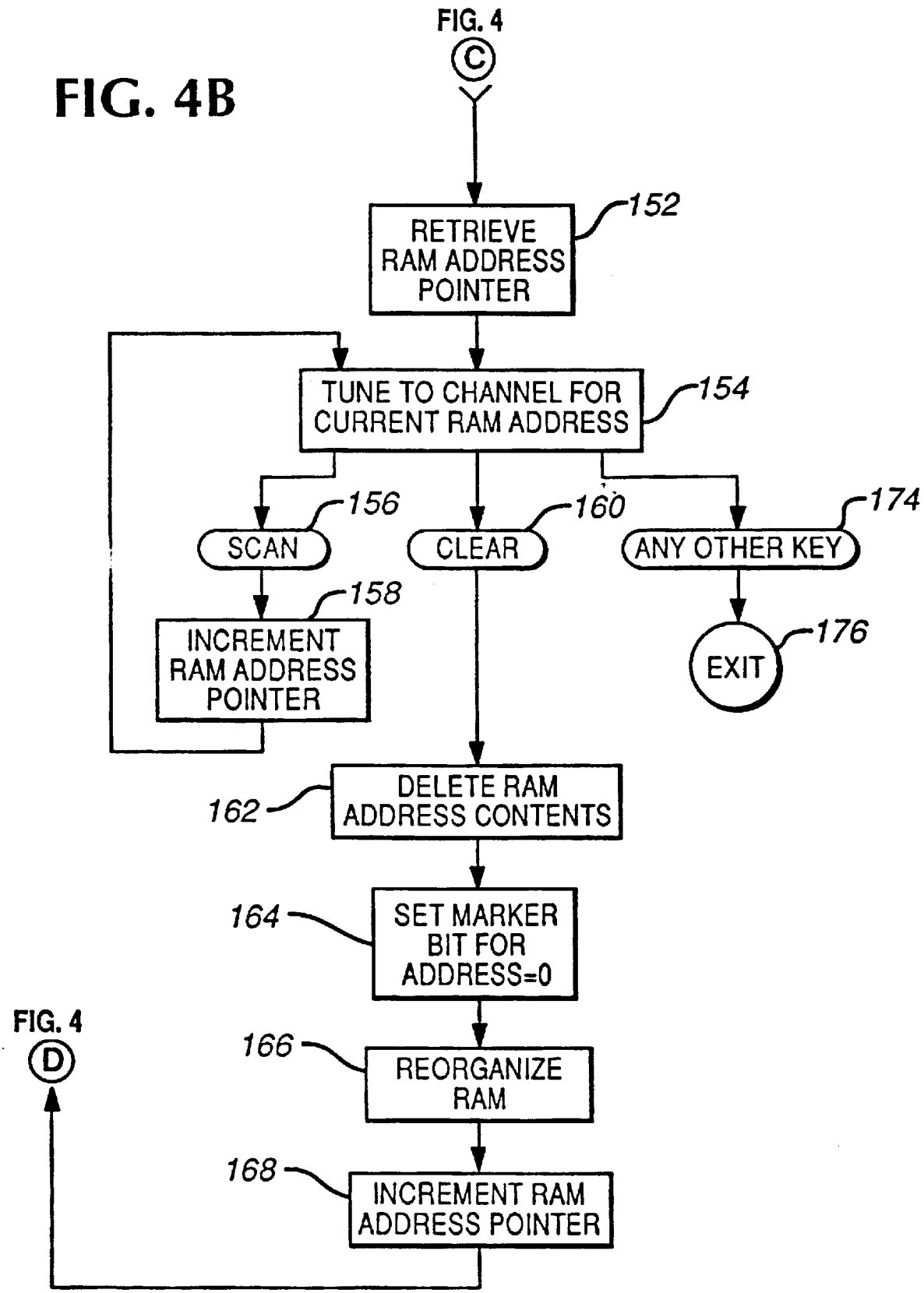
Figure 5:
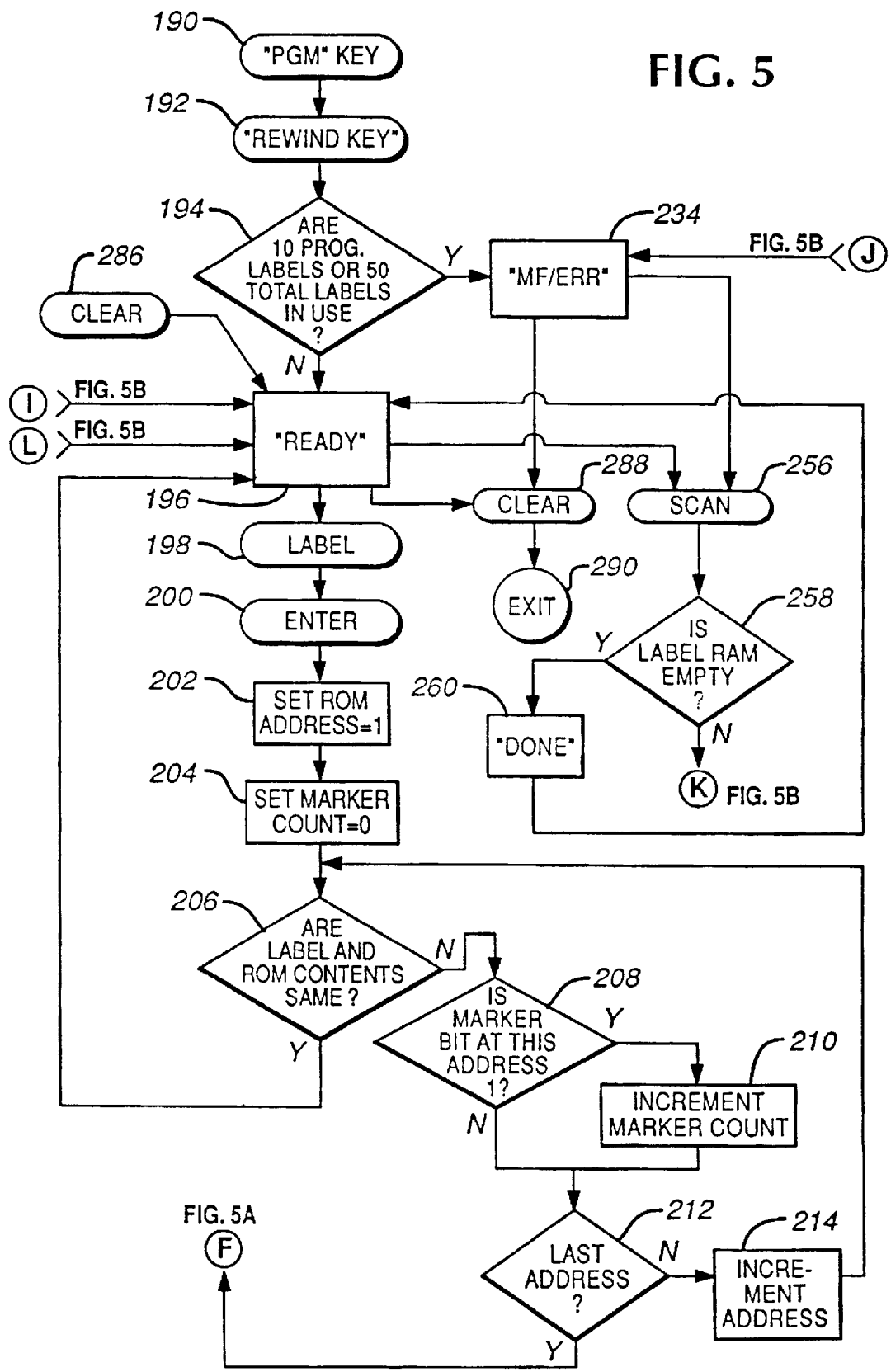
Figure 5A:
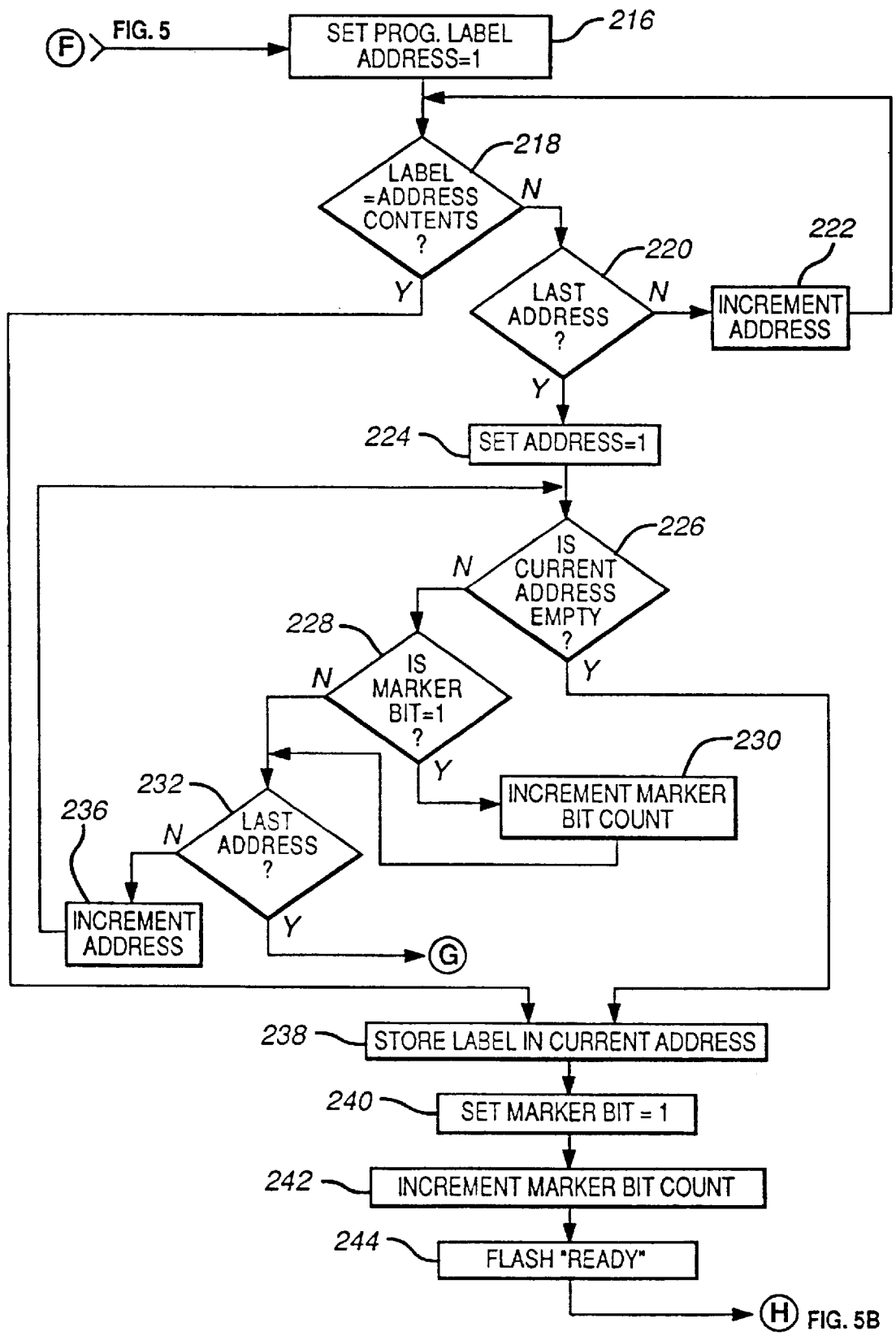
Figure 5B:
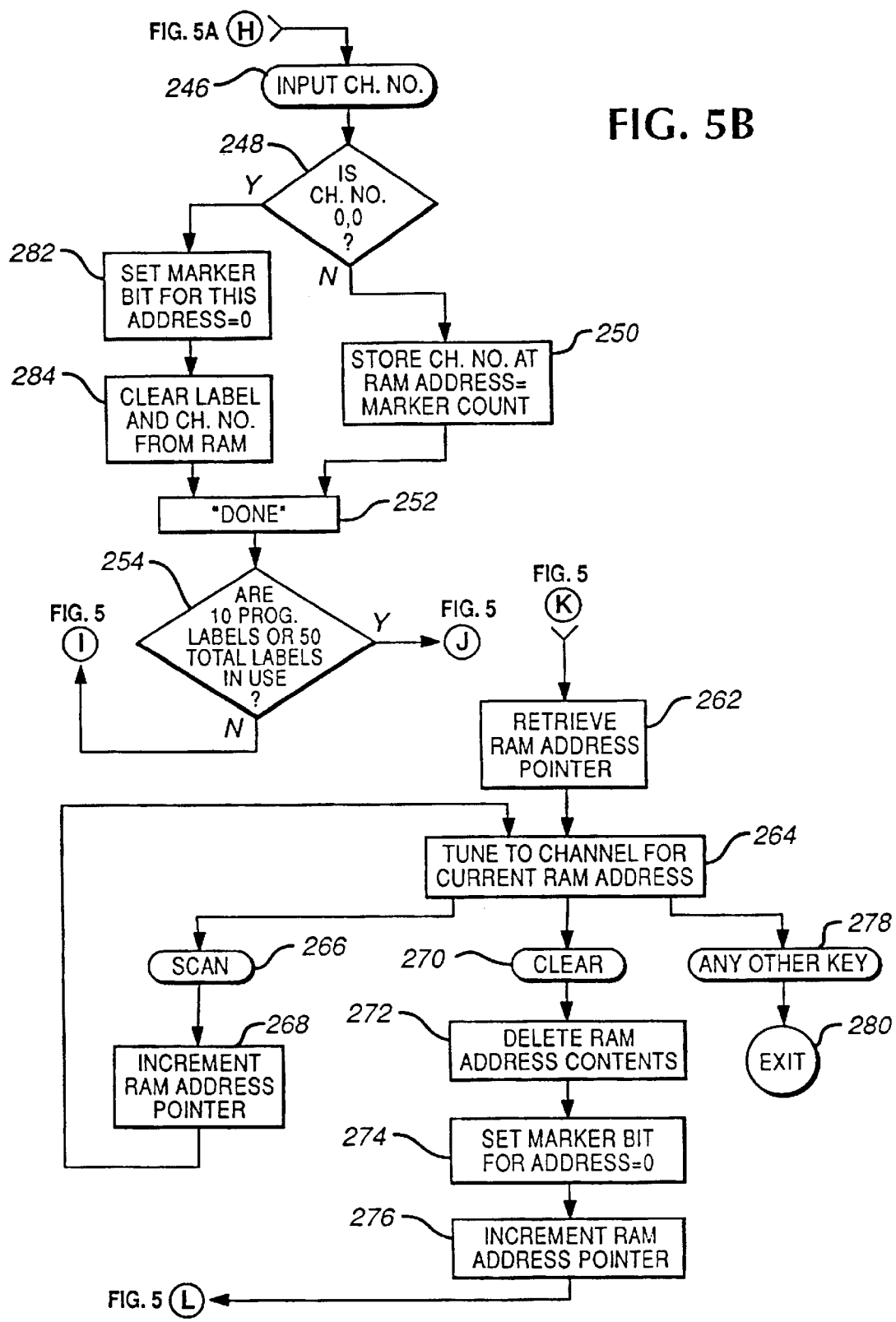

The program for activation of stored labels for subsequent use in channel selection is shown in flowchart form in FIG. 4. The operator begins the program by pressing the "PGM" key (key 58 in FIG. 3), shown at block 100. The operator next presses a "stored labels" function key, as shown at block 102. In the preferred embodiment, to reduce the number of keys located on the remote control unit, this function key may be one of the videorecorder control keys, such as the "PLAY" key. When actuated after the "PGM" key, the system recognizes the alternate function for this dual-function key.

The program determines, at block 104 whether fifty labels have already been activated, and if not, the "Ready" light is illuminated as indicated at block 106.

Upon observing the "Ready" light, the operator enters, block 108, the desired label to be activated. As previously noted, the operator manipulates the alpha/numeric keys 46 of keypad 36 using both the alphabetic and numerical designations imprinted on the keys. The program, however, as a minimum needs only to use the numerical value associated with the input keystrokes. After the label has been entered, the operator presses the "Enter" key, block 110.

As will be explained in greater detail herein, the present invention conserves RAM in the label programming operation through the use of marker bits as an indication as to which of the available stored labels has been activated. In this way, one-to-one correspondence of channel numbers for each stored label is not required. Instead, the software is able to relate each activated label to corresponding channel number stored at a memory position.

When a stored label is activated, a marker bit value of "1" is associated with that ROM memory position, indicating that the label is activated. To store the corresponding channel number, the program counts sequentially the number of ROM addresses with marker bits having values of "1" up to the address at which the selected stored label is located. This marker count is then used as the RAM address for storing the corresponding channel number.

Thus, as an example, consider that the label for "HBO" (value "426") is to be activated. While this label is found in ROM address "21", it may be for example that it is only the eighth of the labels having a marker bit value of "1". Hence, RAM address "8" will be used to store the channel number in this case.

Considered differently, assume that activation of up to forty of the forty-eight stored labels is desired. Each of the forty-eight ROM addresses required a marker bit of "1" or "0" in RAM, or six bytes of memory. Further, assume that one byte of memory is required to store the channel number to be associated with the label. (This latter assumption is based on the capability of one byte to record values from "0" to "255". Most television receivers currently sold have the capability of tuning channels numbered "2" through "125".) Thus, only 46 bytes of programmable memory is required to fully store the data necessary to associate labels with channel numbers.

Returning to the program shown in FIG. 4, and following entry of the desired label, an address counter for the ROM is set to address "1", block 112. A marker bit counter is set to zero, shown at block 114.

The program checks at block 116 to determine whether the entered label is the same as the label stored in ROM address "1". If they are not the same, the program next checks at block 118 to determine whether the marker bit value for this ROM address has been set to "1". If it has, the marker counter is incremented, block 120. If at block 118 it is determined that the marker value is "0", the program bypasses block 120.

In either case, the program next determines at block 122 whether the current ROM address is the last ROM address (for the preferred embodiment, ROM address "48"). If not, the program increments the address counter, block 124, and returns to block 116 to check the input label against the contents of the next ROM address.

In the event a match between the input label and the stored label at the current address is found, the marker bit for that address is set to a value of "1", block 126. The marker count is then incremented at block 128 and the "Ready" light is flashed at block 130, indicating that the system is ready to receive the channel number which is to correspond to the selected label. The channel number is input by the operator using the keyboard, block 132, and the channel number is checked to determine whether it is input as "0,0", block 134. Such an input is used in deactivating stored labels as will be described. Assuming the channel number is some value other than "0,0", the RAM is reorganized, block 136, as described below, to create an empty memory address in RAM at the address that corresponds to the current marker count. The channel number is stored at that address as shown at block 138. In the event a channel number value has been previously stored for this label, which occurs if the label is already in use, the newly-entered channel number overwrites the already-stored value.

Thus, each selected stored label is related by the system software to a memory position. In the preferred embodiment, the label that is identified with the first active marker bit is associated with the channel number stored in the first RAM address, the label identified with the second active marker bit is associated with the channel number stored in the second RAM address, and so forth. However, it will be recognized that RAM addresses may alternatively be associated with marker bits in descending order, in an every-other alternating order, or in any other manner as long as there is a predictable relationship between marker bit order and RAM address.

As an example, consider that the available stored labels are those set out in the order shown in Table I. Eleven stored labels have been activated, and the corresponding channel numbers are stored in RAM addresses 1 through 11. The system status may be summarized as shown in Table II:

TABLE II

| RAM Address | Label | Channel No. | ROM Address |
|---|---|---|---|
| 1 | A&E | 49 | 1 |
| 2 | AMC | 45 | 3 |
| 3 | BET | 59 | 5 |
| 4 | CNN | 30 | 10 |
| 5 | DIS | 6 | 15 |
| 6 | ESN | 37 | 18 |
| 7 | FOX | 29 | 20 |
| 8 | HBO | 3 | 21 |
| 9 | MAX | 5 | 25 |
| 10 | SHO | 4 | 33 |
| 11 | TNT | 18 | 41 |

Now the operator wants to add CBS which is received on channel number "9". The system recognizes from the marker count that the label for CBS should be located in the fourth position in RAM, i.e., the label is the fourth item in ROM having a marker bit at logic "1".

The system then reorganizes the RAM to create an empty address at position four. This can be illustrated by the following Table III that reflects the channel numbers and station labels associated with the memory position.

TABLE III

| RAM Address | Start | Reorganized Memory | "CBS" Added |
|---|---|---|---|
| 1 | 49 (A&E) | 49 (A&E) | 49 (A&E) |
| 2 | 45 (AMC) | 45 (AMC) | 45 (AMC) |
| 3 | 59 (BET) | 59 (BET) | 59 (BET) |
| 4 | 30 (CNN) | Available | 9 (CBS) |
| 5 | 6 (DIS) | 30 (CNN) | 30 (CNN) |
| 6 | 37 (ESN) | 6 (DIS) | 6 (DIS) |
| 7 | 29 (FOX) | 37 (ESN) | 37 (ESN) |
| 8 | 3 (HBO) | 29 (FOX) | 29 (FOX) |
| 9 | 5 (MAX) | 3 (HBO) | 3 (HBO) |
| 10 | 4 (SHO) | 5 (MAX) | 5 (MAX) |
| 11 | 18 (TNT) | 4 (SHO) | 4 (SHO) |
| 12 | Available | 18 (TNT) | 18 (TNT) |

After the channel number has been stored in the appropriate location in RAM, the program causes at block 140 the "Done" light to illuminate. This light will remain illuminated for a period of three seconds, whereafter the system checks at block 142 to determine whether fifty labels have been activated. If not, the program returns to block 106, where the "Ready" light is illuminated and the system awaits the activation of another label or some other action by the operator.

In the event the system determines that all fifty available activated labels have been used, either at block 104 or at block 142, the system causes the "Memory Full/Error" ("MF/ERR") light to illuminate as shown at block 144. At this point, the operator's action may consist of simply exiting the program. In the alternative, the operator may choose to delete one or more of the activated labels from RAM to make space for the addition of other labels.

The operator may also choose to delete label entries when less than the maximum fifty labels have been activated. This may be accomplished when the program is at the "Ready" light shown in block 106.

In either case, the operator presses either of the scan keys 82 and 84 (see keypad layout in FIG. 3), indicated at block 146. Upon actuation of one of these keys, the program at block 148 determines whether the RAM is empty, in which case no labels are activated. In this case, the "Done" light is illuminated for three seconds, block 150, and the program returns to the illumination of the "Ready" light at block 106.

In the event that there are one or more entries in RAM, the program advances to block 152, where a RAM address scan pointer is retrieved. The controller then sends an instruction to the television receiver to tune to the channel number stored in the current RAM address as indicated by the pointer value, block 154. It will be recognized, however, that the controller operates independently of the television receiver, and it is therefore not necessary to the operation of the controller that the receiver actually receive, or respond to, the transmitted instruction. In fact, the television receiver may be off during programming of the controller.

Upon viewing this channel, the operator may decide to retain this channel in the group of activated labels. The operator may then depress the scan key, block 156, which increments the RAM address, block 158, and the program returns to block 154 where the next channel is displayed on the television screen. (It will be recognized that this assumes that the scan "up" key is pressed. In the event the scan "down" key is depressed, the RAM address will be decremented, but otherwise the program operation is the same.) Of course, as is common in the art, this scan is arranged in the form of a ring, so that a scan "up" command from the last address moves the pointer to the first address, and a scan "down" command from the first address moves the pointer to the last address.

If the operator decides to deactivate the channel displayed on the screen, the operator presses the "Clear" key as shown at block 160. The RAM contents at the current address are deleted (or in other words, are set to a value of zero), block 162. Next, at block 164, the marker for the ROM address (or the programmed label address in the case of programmed labels) is set to zero. While this procedure is not detailed in the flowchart of FIG. 4, it will be recognized that this may be done by advancing through the marker bits until the activated (i.e., bit value "1") bit count equals the current RAM address. This bit is then set to a value of zero.

Next, at block 166, the RAM is reorganized to remove the deleted or zero-value address entry. This can be illustrated by the following Table IV that reflects the channel numbers and station labels associated with the memory position, in which the operator decides to delete the label FOX:

TABLE IV

| RAM Address | Start | "FOX" Deleted | Reorganized Memory |
|---|---|---|---|
| 1 | 49 (A&E) | 49 (A&E) | 49 (A&E) |
| 2 | 45 (AMC) | 45 (AMC) | 45 (AMC) |
| 3 | 59 (BET) | 59 (BET) | 59 (BET) |
| 4 | 9 (CBS) | 9 (CBS) | 9 (CBS) |
| 5 | 30 (CNN) | 30 (CNN) | 30 (CNN) |
| 6 | 6 (DIS) | 6 (DIS) | 6 (DIS) |
| 7 | 37 (ESN) | 37 (ESN) | 37 (ESN) |
| 8 | 29 (FOX) | Available | 3 (HBO) |
| 9 | 3 (HBO) | 3 (HBO) | 5 (MAX) |
| 10 | 5 (MAX) | 5 (MAX) | 4 (SHO) |
| 11 | 4 (SHO) | 4 (SHO) | 18 (TNT) |
| 12 | 18 (TNT) | 18 (TNT) | Available |

Once the RAM has been reorganized, the RAM address pointer is incremented, block 168, and the program returns to the "Ready" light at block 106.

During channel display during the label clearing operation, in the event the operator presses any key other than "Scan" or "Clear", as shown at block 174, the program is exited, block 176, and normal television operation is resumed.

As an alternative, the program logic could be arranged to provide that any keystroke other than "Scan" or "Clear"

returns the program to block 106 and illuminates the "Ready" light. The choice of arrangements may be determined by the programmer as to which is more compatible with the human interface.

An alternate method for label clearing can be performed as shown in FIG. 4. From the "Ready" light at block 106, the operator may enter the specific label he wishes to deactivate. The program advances through blocks 108, 110 and so forth to block 130 where the "Ready" light is again illuminated. Instead of entering a channel number, as done during label programming, the operator enters the value "0,0". The program sets the marker value for the corresponding ROM address (or program label address) to zero, block 178, and "clears" the channel number at block 180 by entering a zero value. The RAM is then reorganized in the manner shown by Table IV at block 182, and the "Done" light is illuminated at block 140 for three seconds. The program then continues as has been described previously.

The label programming routine may be exited without completing the programming routine in progress. Except at block 154, pressing the "Clear" key as shown at block 184 interrupts the program and returns to the "Ready" light at block 106. When the "Ready" lamp is illuminated, pressing the "Clear" key as shown at block 186 will cause the program to exit, shown at block 188. Thus, if the "Ready" lamp is not illuminated during operation of the program shown in FIG. 4, pressing the "Clear" key twice will exit the program.

In addition, at any point in the program where operator input is needed, a lack of input for fifteen seconds will cause the program to "time out" and return the system to normal operation.

As has been noted, in addition to stored labels, the operator may activate programmed labels which may be characters entered by the operator other than those stored in ROM as stored labels. A portion of RAM is reserved for up to ten of these programmed labels, which are otherwise generally handled by the program in a manner similar to the stored labels. To create a programmed label, the operator enters the label program of FIG. 5, beginning the program by pressing the "PGM" key (key 58 in FIG. 3), shown at block 190. The operator next presses a "programmed labels" key, which in this embodiment is an alternate action for the videorecorder "REWIND" key, as shown at block 192. The program determines, at block 194 whether ten programmed labels or fifty total labels have already been activated, and if not, the "Ready" light is illuminated as indicated at block 196.

Upon observing the "Ready" light, the operator enters, block 198, the desire label to be stored, and the "Enter" key, block 200. The label may be any keystroke sequence corresponding to one or more keystrokes, up to the limit permitted by the memory configuration.

As in the case of the stored labels, marker bits are used as an indication that a programmed label has been created. When a stored label has been created, a marker bit value of "1" is associated with that ROM memory position, indicating that the label is activated. To store the corresponding channel number, the program counts sequentially the number of RAM addresses for programmed labels with marker bits having values of "1" up to the address at which the selected stored label is located. This marker count is then added to the marker count for the stored label ROM addresses, and used as the RAM address for storing the corresponding channel number.

In the preferred embodiment, a marker bit is associated with each of the ten possible programmed labels. This is done as a convenience in that the data handing routines are similar for both stored and programmed labels. However, as an alternate embodiment, the "marker bit" may be a determination that the address contents are not all zeros. A marker value is the existence of this condition.

Following entry of the desired label, a check is made to determine whether the desired program label is the same as one of the stored labels, whether activated or not. The program will not permit programmed labels to be the same as stored labels. Because only ten programmed labels are available, this prevents the operator from using one or more of this limited number of addresses to store a label already available elsewhere in the system. Thus, an address counter for the ROM is set to address "1", block 202. A marker bit counter is set to zero, shown at block 204.

The program checks at block 206 to determine whether the entered label is the same as the label stored in ROM address "1". If they are not the same, the program next checks at block 208 to determine whether the marker bit value for this ROM address has been set to "1". If it has, the marker counter is incremented, block 210. If not, block 210 is bypassed.

In either case, the program next determines at block 212 whether the current ROM address is the last ROM address (for the preferred embodiment, ROM address "48"). If not, the program increments the address counter, block 214, and returns to block 206 to check the input label against the contents of the next ROM address.

In the event a match is found at block 206 between the input label and a stored label at the cent address is found, the program returns to the "Ready" light at block 196, indicating that the input label cannot be used as a programed label.

In the event no match is found between the input label and any stored label, the program next checks to determine whether the entered label is the same as any previously used programmed label, in which case the program will overwrite the previously programmed corresponding channel number with the new. Thus, at block 216, the programmed label address of the RAM is set to 1, and a determination is made at block 218 whether the label is the same as that in the first memory address. If not, the program determines at block 220 whether this is the last (i.e., tenth in the preferred embodiment) address, and if not, the address is incremented at block 222. The program returns to block 218 and block 220 until all address contents have been checked. If the entered label has not been found, the address is reset to 1 at block 224 and a determination is made at block 226 whether the contents of this address is zero (i.e. empty). If not, the program confirms whether the marker bit associated with this address has a value of "1", block 228, and if so, increments the marker count at block 230 (which continues the count begun during the review of stored labels in ROM). A determination is made whether this is the last address for programmed labels at block 232, and if so, this indicates that all ten memory addresses have labels stored therein. The program moves to block 234, where the "Memory Full/Error" ("MF/ERR") light is illuminated. If it is not the last address, the address is incremented, block 236, and the next address is checked.

In the event an empty address is found at block 226, or in the event the input label is the same as a label already stored as determined at block 218, the label is stored in the current address as shown at block 238. The marker bit associated with this address is set to "1", block 240, and the marker count is incremented at block 242. The program then flashes the "Ready" light, block 244, to indicate to the operator that the channel number to correspond to the label may be entered.

The channel number is input by the operator using the keypad, block 246, and the channel number is checked to determine whether it is input as "0,0", block 248. Such an input is used to deactivate programed labels, as is the case with stored labels described above. Assuming the channel number is some value other than "0,0", the channel number is stored at the address that corresponds to the current marker count, as shown at block 250.

After the channel number has been stored in the appropriate location in RAM, the program causes the "Done" light to illuminate, block 252. This light will remain illuminated for a period of three seconds, whereafter the system checks at block 254 to determine whether ten programmed labels have been activated. If not, the program returns to block 196, where the "Ready" fight is illuminated and the system awaits the activation of another label or some other action by the operator.

In the event the system determines that all ten available labels have been used, either at block 194 or at block 254, the system causes the "Memory Full/Error" light to illuminate as shown at block 234. At this point, in a manner similar to that used for stored labels, the operator may choose to exit the program or delete one or more of the programed labels from memory.

The operator may also delete label entries when the program is at the "Ready" light shown in block 196.

In either case, the operator presses either of the scan keys 82 and 84 (see FIG. 3), indicated at block 256. Upon actuation of one of these keys, the program at block 258 determines whether the label RAM is empty, in which case no labels are activated. In this case, the "Done" light is illuminated for three seconds, block 260, and the program returns to the illumination of the "Ready" light at block 196.

In the event that there are one or more entries in RAM, the program advances to block 262, where the current RAM address pointer is retrieved and an instruction is sent to the television to tune to the channel number stored in this RAM address, block 264.

Upon viewing this channel, the operator may decide to retain this channel in the group of activated labels. The operator may then depress the scan key, block 266, which increments the RAM address, block 268, and the program returns to block 264 where an instruction to the television receiver to display the next channel is transmitted.

If the operator decides to deactivate the label associated with the current channel, the operator presses the "Clear" key as shown at block 270. The RAM contents at the current address are deleted (or in other words, are set to a value of zero), block 272. Next, at block 274, the marker for the label RAM address is set to zero.

At block 276, the RAM address pointer is incremented, and the program returns to the "Ready" light at block 196.

During channel display during the label clearing operation, block 264, in the event the operator presses any key other than "Scan" or "Clear", as shown at block 278, the program is exited, block 280, and normal operation is resumed. (As with stored labels, in an alternate embodiment, the program may be designed whereby pressing of any key other than "Scan" or "Enter" returns the program to the "Ready" light at block 196. In this way, the operator may simply decide to keep all current labels.)

An alternate method for label clearing can be performed from the "Ready" light at block 196. The operator may enter the specific label he wishes to deactivate, and the program advances through blocks 198, 200 and so forth to block 244 where the "Ready" light is flashed. Instead of entering a channel number, as done during label programming, the operator enters the value "0,0". The program sets the marker value for the corresponding programmed label RAM address to zero, block 282, and clears the label and channel number at block 284 by entering zero values. The "Done" light is then illuminated for three seconds at block 252.

The label programming routine in progress may be exited by pressing the "Clear" key as shown at block 286, which interrupts the program and returns to the "Ready" light at block 196. When the "Ready" light is illuminated, pressing the "Clear" key at block 288 will cause the program to be exited, block 290.

Figure 6:
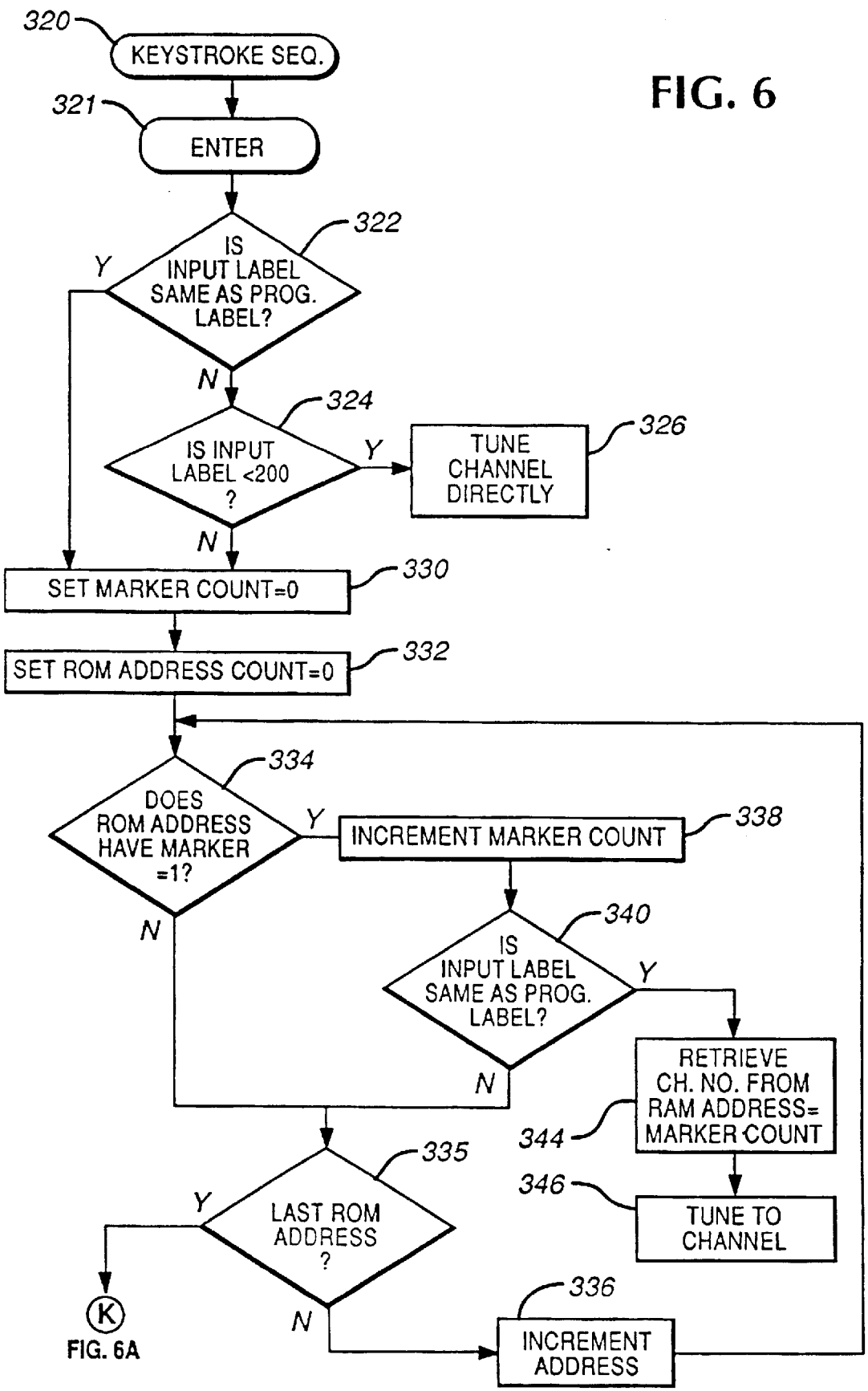
Figure 6A:
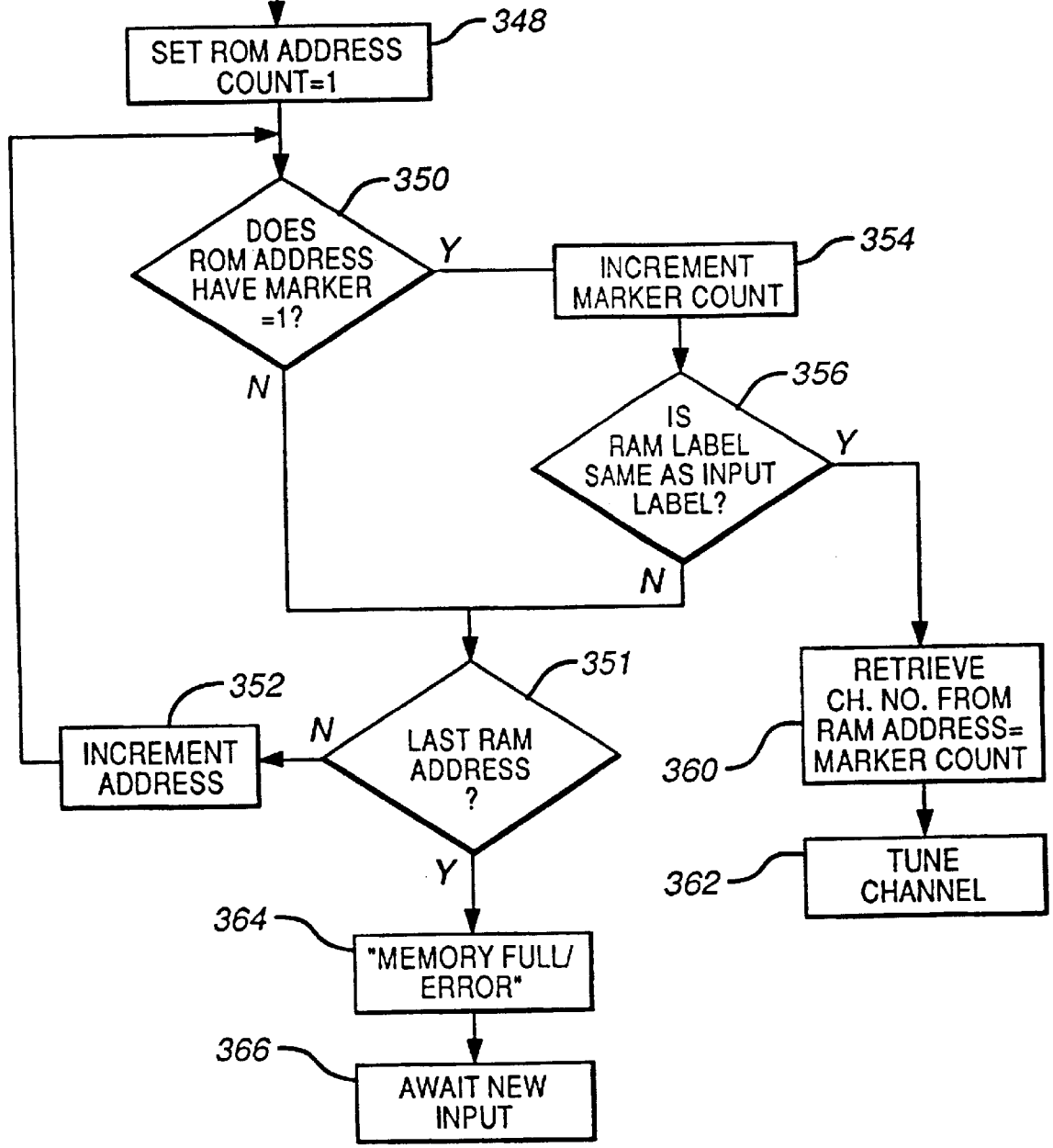

Tuning of television channels, including the use of stored labels or programmed labels, may be accomplished using the program shown in flowchart form in FIG. 6. The program begins at block 320 with the entry of a keystroke sequence by the operator using the keypad, followed by the "Enter" key at block 321. An entered value may correspond to one, two, three or more keystrokes.

At block 322, a determination is made whether the entered keystroke sequence (hereinafter called the "input label") is the same as any of the stored programmed labels. (It is possible the operator may have stored, for example, a programmed label comprised of one or two keystrokes.) If there is no match, the program next checks at block 324 whether the input label corresponds to a numerical value of less than 200. As can be seen by reference back to FIG. 3, number key "1" of alpha/numeric keys 46 has no alphabetic characters associated therewith. As a result, the program recognizes a one or two digit value, or three digit value between 100 and 199 as a directly-selected channel. The program moves to block 326, where instructions to tune the entered channel number directly are transmitted by the controller. (Television receivers currently commercially available typically provide for channel selection through channel "125". Also, this assumes no programed label of the input value has been stored.)

If an input value of 200 or greater is entered, or a value which corresponds to a programmed label is entered, the program proceeds to block 330 where the marker count is set to zero, and at block 332 where the ROM address counter is set to "1". At block 334, the program determines whether the current ROM address (address "1") has a marker value of "1" associated therewith. If not, the program checks at block 335 as to whether the current ROM address is the last ROM address (i.e., in the preferred embodiment when the ROM address equals forty-eight). If not, the address is incremented at block 336, and the program returns to block 334 to determine whether this next ROM address has an associated marker bit value of "1".

When a marker bit value of "1" is identified at block 334, the marker bit count is incremented, block 338, and a determination is made at block 340 whether the value at the current ROM address is equal to the input label. If not, a determination is made at block 335 whether the current ROM address is the last ROM address. Provided the current address is not the final ROM address, the address is incremented at block 336 and the program returns to block 334.

In the event the contents of the current ROM address is equal to the input label, the program uses the current marker count to retrieve the channel number from the corresponding RAM address, shown at block 344. An instruction to the television to select the channel is transmitted, block 346.

Returning to block 335, in the event all ROM addresses have been reviewed without locating a corresponding, activated stored label, the program proceeds to block 348 where the programmed label RAM address is set to "1". (The current marker count value is retained.) At block 350, a check is made to determine whether the corresponding marker bit for this address has a bit value of "1", and if not, the program advances to block 351 where it is determined whether the current address is the last RAM address (i.e., in the preferred embodiment, RAM address "10"). If not, the address is incremented, block 352, and the program returns to block 350 to make a determination for the next memory address. If an activated marker bit is found, however, the marker count is incremented, block 354, and the program at block 356 determines whether the contents of the current memory address equal the input label. If not, a determination is made as to whether the current address is the last address, block 351, and if it is not, the address is incremented at block 352 and the program returns to block 350.

In the event the current address contents equal the input label, the program at block 360 uses the current marker count to retrieve the channel number from the corresponding RAM address. An instruction to the television to select the channel is transmitted, block 362.

If all addresses are reviewed without a matching programmed label being found, then from block 358 the program proceeds to block 364 where the "Memory Full/Error" light is illuminated for three seconds, whereafter the program is ready for and awaits new input, block 366.

Another feature of the television controller of the present invention is the provision of "Favorite Channels." This feature comprises a shortened scanning list of the ten (or fewer) favorite or most watched channels of the television operator. Rather than scroll through each available channel when reviewing available programming, the operator may scroll through the shortened list.

In a preferred embodiment of the present invention, up to ten favorite channels may be stored as described in detail herein. During television tuning, operation of the favorite channel scroll is performed in a manner similar to that typically used for conventional scanning operations. A scanning marker value may be used to retain the current address value corresponding to the current position within the scan. Actuation of the favorite channel ("FC") scan up key causes the marker value to be incremented and the next channel stored in memory will be displayed on the television. Actuation of the FC scan down key decrements the marker value to the next preceding channel stored in memory. Provision may be made to slip over any addresses which are empty.

Figure 7:
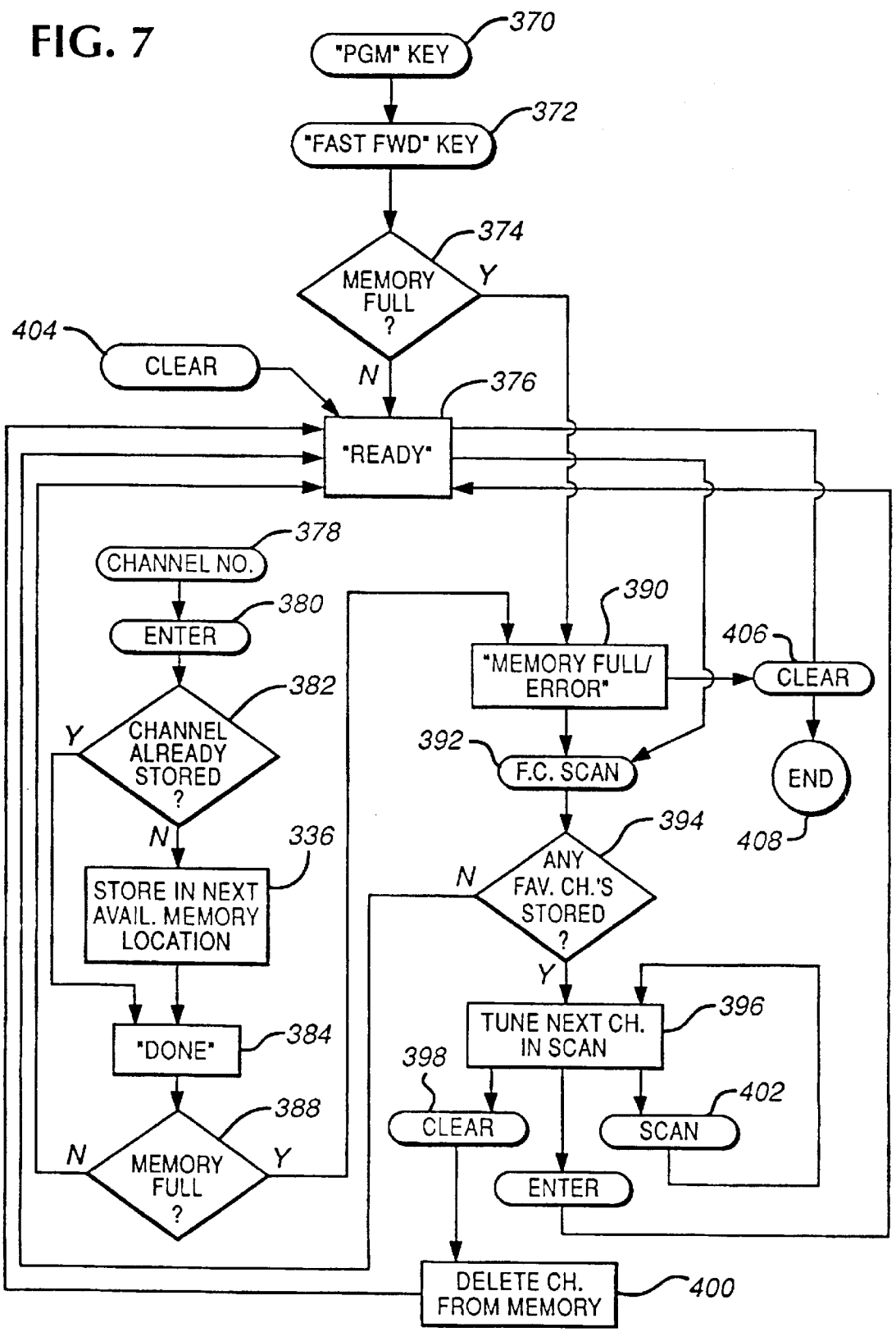

The program for selecting channels for inclusion in the favorite channel scan may be seen in flowchart form in FIG. 7. The operator presses the "PGM" key at block 370, followed by a "favorite channel" function key, which in the preferred embodiment is an alternate function for the videorecorder "FAST FORWARD" key, as shown at block 372. At block 374, the program determines whether the memory is full, i.e. in the preferred embodiment, whether ten favorite channels have already been stored. In the event less than ten such channels have been programmed, the "Ready" light is illuminated at block 376.

The operator may enter a channel number desired for inclusion in the FC memory at block 378, followed by the enter key at block 380. A determination is made at block 382 by reviewing the memory contents whether the input channel number has been previously programmed. If so, the program advances to block 384, where the "Done" light is illuminated for three seconds. If not, the next available empty address in memory is found and the channel number is stored at that location, block 386. The program then advances to block 384 and illumination of the "Done" light for three seconds. The program checks at block 388 to determine whether ten channels have now been stored, and if not, the program returns to the "Ready" light at block 376.

If the determination made at either blocks 374 or 388 indicate that the memory is full, the program advances to block 390 where the "Memory Full/Error" light is illuminated. Further additions of channels to the FC scan can then only be accomplished after deleing one or more of the stored channel number values.

Channels may be deleted from the FC scan from either the "Ready" light at block 376 or the "Memory Full/Error" light at block 390. In either case, the operator presses either of the FC scan keys, shown at block 392. The program determines whether any channels are stored in memory, block 394, and if not, returns to the "Ready" light at block 376. If one or more channel numbers are stored, however, the an instruction to display the next channel in the FC scan is transmitted, block 396. The operator may now choose to delete the current channel from the scan, in which case the "Clear" key is pressed, block 398, and the displayed channel is deleted from the FC scan memory at block 400. The program then returns to the "Ready" light at block 376.

Alternatively, from block 396, the operator may chose not to delete the displayed channel. Pressing either FC scan key, block 402, will advance the scan (in the selected direction) and return the program to block 396 where the next channel is displayed.

In the event the "Enter" key is pressed at block 396, as shown by block 403, the program returns to the "Ready" light, block 376, without deleting the displayed channel from memory. (In an alternate embodiment, pressing any key other than the "Enter" key at block 396 returns to the "Ready" light at block 376.)

The program may be interrupted anytime by pressing the "Clear" key. Pressing the "Clear" key, block 404, returns the program to the "Ready" light at block 376. Pressing the "Clear" key again, or pressing the "Clear" key for the first time in the event the program is already at the "Ready" light, at block 406, causes the FC program to be exited, block 408. In addition, pressing the "Clear" key while the program is at block 390, the "Memory Full/Error" light, also exits the program.

Finally, in the event the program is at a block where operator input is required, the program will be exited if no key is depressed for a period of fifteen seconds.

In the embodiment described in detail herein, only a single favorite channel scan is provided. However, it will be recognized by those skilled in the art that multiple favorite channel scans may be provided using a program similar to that shown in FIG. 7. In such a case, additional keys may be provided on the remote controller for the selection of the particular scan to be used.

Also in the preferred embodiment, channel additions to the favorite channel scan are entered in the next available memory location, so that the operator has no programmable control over the specific position in the scan order a particular channel will occupy. However, the program may be modified, as will be understood by those skilled in the art, to create an open memory location at the current scan location for the system. Memory reorganization to accomplish this task can be performed in a manner generally similar to that described in connection with Table III herein.

As a further feature of the present invention, a "short list" scan may be provided in which up to four channels may be stored for use in quickly moving between a small number of channels, such as when several programs are being monitored simultaneously. While channels are retained in the short list for scanning until they are deleted or overwritten by other channels, the short list is suited for the temporary storage of several channels of current interest.

Figure 8:
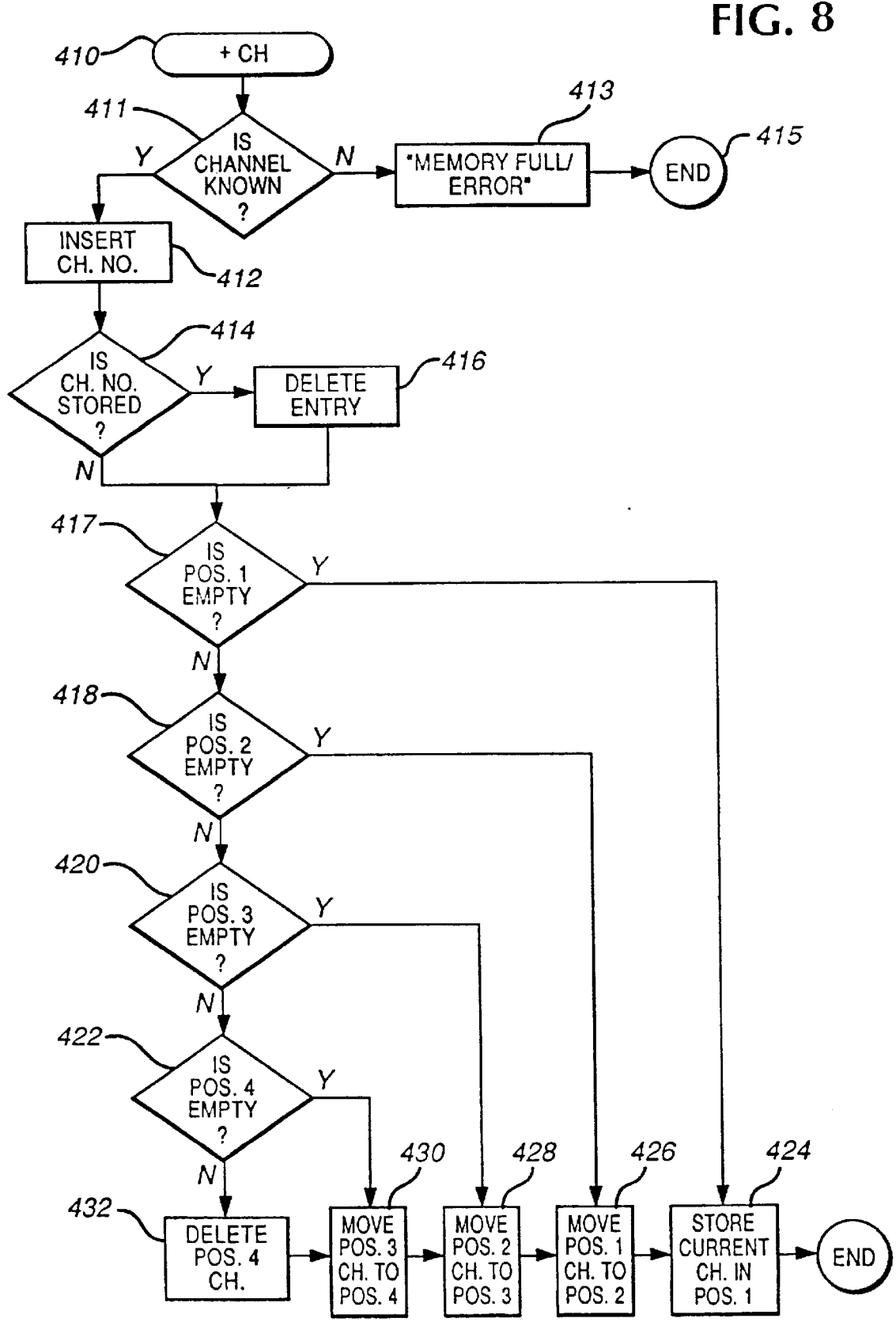

The programming of channels into the short list may be seen by reference to the flowchart of FIG. 8. Programming can be carried out provided the controller knows the channel to which the television is currently tuned. In the event the control system described herein is built into a television receiver, it will be generally possible for the system to know at all times to which channel the receiver is tuned. However, in the case of a universal remote controller as in the preferred embodiment, where a conventional channel scan operation is performed, the controller will not know which channel is tuned. In typical channel scans, for example, it is common for the receiver to program certain channels which do not receive transmissions to be skipped during scanning. Because this information is programmed into the receiver and not the remote, a remote controller will not know which channels may have been skipped.

In the preferred embodiment, the controller will know which channel the receiver is tuned to in the case of direct tuning by channel number, or in the case of tuning by either stored or programmed labels. Also, the controller will know the channel in the case of favorite channel scans, or short list scans as described herein below.

Upon deciding to add a channel to the short list scan, the operator presses the "+CH" key, shown as key 74 on keypad 36 in FIG. 3. Pressing this key, shown at block 410 in FIG. 7, causes the system to inquire at block 411 whether it knows the current channel of the television receiver. If not, the "Memory Full/Error" light is illumine for three seconds, block 413, and the program routine is ended, block 415.

If the channel number is known, that channel number is inserted at block 412. A review of the channels currently in the short list memory is made at block 414, and in the event the channel number is found, it is deleted by entering a value of zero into the corresponding memory location, block 416.

In the event the channel is not already stored, or following its deletion, a check is made to define whether the first short list memory position is open, block 417. If not, a check is made of the second position, block 418, and if the position is not open, the third position at block 420 and then the fourth position at block 422 are checked. In the event the first memory position is open, the current channel is stored at that position, block 424. If not open, and if the second position is open, the contents of the first position is moved to position two, block 426, and the channel is stored in the first position. Similarly, if the third position is open, the contents of the first and second positions are moved to positions two and three, respectively, blocks 428 and 430, with the channel again being stored in position one. If the fourth position is open, the memory contents are moved one position to open the first position, where the current channels is stored, as shown at blocks 426, 428 and 430.

If all memory positions are full, then the channel contained in the fourth position is deleted, block 432, and the channels are moved as has been described to enable the current channel to be stored in position one.

It can therefore be seen that storage of channels in the short list is performed in a "first-in/first-out" manner, with the latest channel stored occupying the first memory position. The earliest channel stored is automatically deleted if a fifth channel is attempted to be stored.

Figure 9:
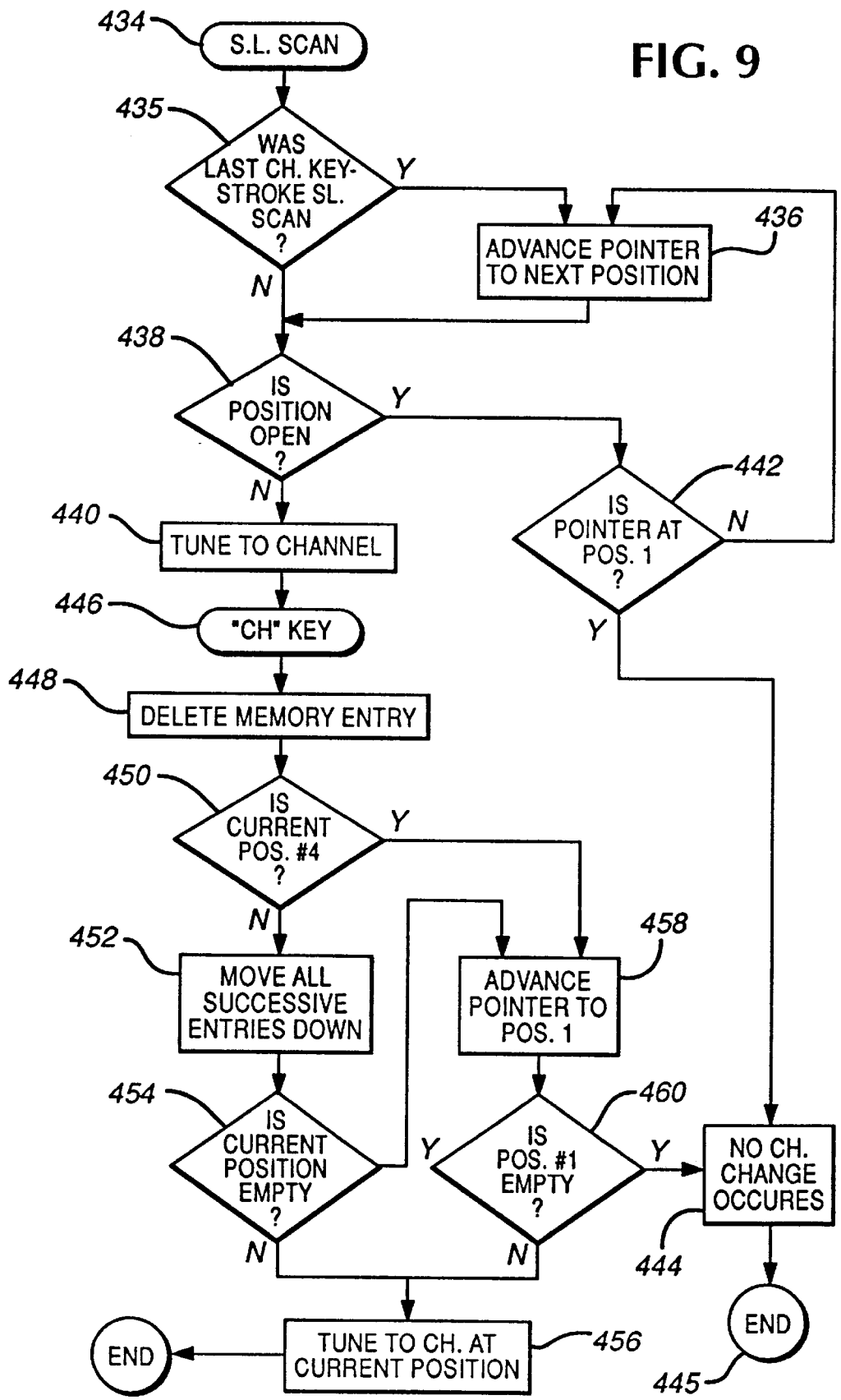

It is possible to delete specific channels from the short list, the program for performing the deletion being included in the program for channel selection using the short list shown in flowchart form in FIG. 9. The program is made functional upon pressing of either of the short list scan keys 76 and 78 in keypad 36 (see FIG. 3). Upon pressing the scan key, block 434, the system determines whether the keystroke preceding the scan key was another actuation of the short list scan keys, block 435. If so, it is necessary to advance the short list pointer to the next scan position, shown at block 436, since it will be desired to advance to the next stored channel. However, in the event the preceding channel selection keystroke was some other key, indicating that the operator selected a channel outside the short list, it will be desired to return to the same channel within the short list. Thus, in this case, block 436 is bypassed.

This scan pointer "advance" is in the up direction when the scan-up key is depressed, and in the down direction when the scan-down key is depressed. Memory positions four and one are considered to be adjacent for scanning purposes.

A check is made at block 438 to determine whether the current memory position is empty. In the event it is not, the channel number is retrieved and an instruction to tune to the channel is transmitted, block 440. However, if the memory position is empty, the program determines at block 442 whether the scan pointer is at position one. Recalling that in storing channels, all positions are filled from position one up, that position can be empty only if the entire short list memory is empty. Thus, a determination at block 442 that the pointer is at position one indicates an empty memory, and no channel change occurs, block 444. The program is then ended, block 445.

If the pointer is not at position one when an empty memory position is found, the program proceeds back to block 436 where the pointer is incremented and the next memory position is reviewed at block 438.

In addition to deletion caused by entry of a fifth channel into the short list, channels may be deleted from the short list as shown in FIG. 9. Once a channel is tuned at block 440, the operator may press the "-CH" key, shown at 80 of keypad 36 in FIG. 3, as indicated at block 446. The memory entry at the current position is deleted, block 448. A determination is made whether the scan pointer is currently at position four, block 450. If not, all entries at positions higher that the current position are moved down, block 452, with the result that the vacant memory position is moved to position four. A check is made at block 454 to determine whether the current memory position is empty, and if not, an instruction to tune the channel stored at the current position (formerly at the next higher memory position) is transmitted, block 456.

If the determination at block 454 indicates that the current memory position is empty, it signifies that the just-deleted memory entry was in the highest filled memory position. The program then proceeds to block 458, where the scan pointer is moved to position one. Also, the program moves to block 458 in the event the determination at block 450 shows the current position where the channel number has been deleted to be position four. The program then checks to determine whether memory position one is empty, block 460, and if not, displays that channel on the television, block 456. In the event memory position one is empty, no channel change occurs, block 444, indicating that the short list memory is empty.

One further feature of the present invention relates to the keys used to select the particular device to be controlled. As is commonly known in the art, the remote control unit of the present invention is capable of controlling several devices, such as a television, videorecorder and cable box. In addition, the controller may be of the "universal" coded type, typically capable of controlling six or more such devices from a variety of manufacturers. Located in ROM is preprogrammed data sufficient to translate the keystrokes entered on the keypad into the properly encoded transmitted signals to which a device from a particular manufacturer or a device of a particular model will respond. (This "coded" remote is in contrast to a "learning" remote in which the encoded signals must be learned from signals transmitted from another control device. Such devices are typically unprogrammed for any device until such time as they are "taught" from the other device.)

In use, again as commonly understood the art, a program is provided whereby the operator may select from a plurality of programs the specific code sequences for the device in question. The selection is typically made by entering one or more characters representative of the device and/or manufacturer.

In addition, during use of the controller, the operator may switch the device from controlling, for example, a television to a video recorder, by pressing the appropriate device selection key 67 (see FIG. 3). This causes the transmission format of the controller to be changed to be compatible with the selected device until another of the device selection keys is depressed.

In currently known controllers having preprogrammed device controlling keys, it is possible for the operator to inadvertently actuate a device selection key without realizing this has been done. This is particularly a problem if the accidentally selected device is one not in use by the operator, for example actuating the cable box selection key when no cable box is present. This is because further actuation of keys on the controller will seem to the operator to have no effect. The operator may have difficulty identifying the cause of this situation, and may assume (incorrectly) that the controller is not properly functioning.

In accordance with the present invention, in one embodiment of the invention, a "deselection" code is provided for each of the device selection keys in addition to the transmission formats available for various manufacturers. Thus, while the operator may enter a code to program the device to emit control signals compatible with for example a particular model of cable box, the operator may enter a code indicative of the absence of a cable box entirely. Entry of such a code deactivates the device selection key (for the cable box in this example), so that upon pressing the cable box key, the device continues to send out control signals that can be interpreted by the equipment previously selected. Thus, accidental pressing of a device selection key has no effect on the further operation of the control device. Further, the device may be manufactured with the deselection code initially programmed for all selectable pieces of equipment. In this way, it is not necessary for the operator to do anything to insure that unused keys are unprogrammed.

It will also be readily recognized that other data items may be programmed by the control device manufacturer into the ROM if desired. For example, it may be desired to provide a display legend corresponding to each of the stored labels that will give to the operator a readable channel identification word or phrase on the screen upon channel selection. Thus upon selection of "HBO" by entering keystrokes "4,2,6", a display entry in ROM containing the alphabetic characters "HBO" may be retrieved from ROM at the same time the label entry in ROM is identified (see block 116 in FIG. 4). Of course, it will be recognized that the label can be anything capable of being stored and displayed, and may be different from the nominal alphabetic equivalent of the stored label (e.g., "HOME BOX OFFICE" in the above example).

Also, it will be recognized that the marker bit technique described herein for finding correspondence between labels stored in ROM and channel numbers stored in RAM may be used in a reverse direction to find entries in ROM that correspond to channel numbers in RAM. For example, suppose that HBO is received by the television on channel "3" and stored in ROM is the display legend "HBO". As previously described, entry of the keystrokes "4,2,6" will cause the television to tune to channel "3" and the legend "HBO" to be displayed on the screen. However, in the event the operator directly selects channel "3", the control device may be programmed to review the channel number RAM to determine whether channel "3" has been stored. On finding the channel number, the RAM address can be used to count through the marker bits to determine the corresponding ROM address. The "HBO" legend can then be retrieved from ROM for display on the television screen.

The manner in which the device software can be programmed for this operation will be readily understood by those skilled in the art.

This technique may be used for other data stored in ROM. For example, in controlling a videorecorder using the device described in U.S. Pat. No. 5,307,173 (such devices being commercially sold under the trademark "VCR+") in which a compressed code contains time, date, channel and duration information concerning the program to be recorded, a channel conversion may be required as previously described. For most of the available program networks, the manufacturer of commercially available devices made in accordance with this patent has assigned "defined" channel numbers used on a nationwide basis. Thus, in the commercially-available system, HBO requires a conversion to channel "33" for the compressed code to be understood. This conversion data may be stored in the ROM of the present invention and retrieved in the manner described above. Such a technique will greatly reduce the necessity for initial configuring of a control system incorporating the feature of U.S. Pat. No. 5,307,173. In the event both labels and conversion data for this system are stored in ROM, selection of labels for channels will automatically set up the configuration for these channels, and vice versa.

In another feature which may be used with the present invention, the RAM includes a data buffer into which the numeric keystroke sequence most recently entered is captured. This sequence is retained until another numeric key or any other channel-changing key is pressed, and all other key actuations are ignored. Thus, in the event a channel selection is made while the remote control is not being properly pointed at the television receiver, or in the event transmission range is reduced due to obstacles or weak batteries, the operator may simply press the "Enter" key to resend the keystroke sequence. The sequence itself need not be reentered.

While the embodiments described herein constitute preferred embodiments of the present invention, it should be recognized that changes and variations may be made therein without departing from the scope of the present invention, which is defined in the appended claims.

What is claimed is:

1. A remote-control apparatus for controlling a television receiver to select a television channel corresponding to a preassigned channel designation, the apparatus comprising:

a programmable memory having a predetermined number of channel addresses for storing up to said predetermined number of channel designations;

a control for generating a channel change signal, a store signal and a retrieve signal;

a transmitter for transmitting a control signal to the television receiver;

a processor for, (a) upon receipt of said channel change signal, causing said transmitter to transmit said control signal to the television receiver to change the channel designation to which the television receiver is currently tuned; (b) upon receipt of said store signal, causing said memory to store in one of said addresses a first stored channel designation corresponding to the channel designation to which the television receiver is currently tuned and, (c) upon receipt of said retrieve signal, generating a control signal for instructing the television to tune to said first stored channel designation;

said processor further including means for determining whether said processor knows the one of said channel designations to which the television receiver is currently tuned, and for causing said memory to store said first stored channel designation only in the event said processor knows said one of said channel designations.

2. Remote-control apparatus for controlling a television receiver as claimed in claim 1, wherein said control generates a plurality of types of said channel change signal, and wherein said means for determining whether said processor knows the one of said channel designations to which the television receiver is currently tuned includes means for determining the type of previously received ones of said channel change signals.

3. Remote-control apparatus for controlling a television receiver as claimed in claim 2, wherein said types of channel change signals include a first type comprising direct entry of a desired one of said channel designations, and a second type comprising a command to step to a next of said channel designations, and wherein said means for determining whether said processor knows the one of said channel designations determines whether one of said first type of said channel change signals has been previously received.

4. Remote-control apparatus for controlling a television receiver as claimed in claim 3, wherein said types of channel change signals include a third type comprising entry of a label previously stored in said memory as corresponding to a desired one of said channel designations, and wherein said means for determining whether said processor knows the one of said channel designations determines whether one of said third type of said channel change signals has been previously received.

5. Remote-control apparatus for controlling a television receiver as claimed in claim 1, further comprising means for displaying an error message, and wherein said processor further includes means for, upon receipt of said store signal and in the event said processor does not know said one of said channel designations to which the television receiver is currently tuned, causing said error message means to display said error message.

6. Remote-control apparatus for controlling a television receiver as claimed in claim 5, wherein said means for displaying an error message includes an indicator light disposed on said remote-control apparatus.

\* \* \* \* \*